(12) United States Patent
Park et al.

(10) Patent No.: US 9,310,646 B2
(45) Date of Patent: Apr. 12, 2016

(54) DISPLAY DEVICE

(75) Inventors: Sangtae Park, Seoul (KR); Seungchoon Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 806 days.

(21) Appl. No.: 13/343,545

(22) Filed: Jan. 4, 2012

(65) Prior Publication Data

US 2012/0170253 A1 Jul. 5, 2012

(30) Foreign Application Priority Data

Jan. 5, 2011 (KR) .................. 10-2011-0000965

(51) Int. Cl.
*G02F 1/133* (2006.01)
*G02F 1/1335* (2006.01)

(52) U.S. Cl.
CPC .... *G02F 1/133608* (2013.01); *G02F 1/133603* (2013.01); *G02F 1/133606* (2013.01); *G02F 2001/133612* (2013.01)

(58) Field of Classification Search
CPC .. G02B 6/0013; G02B 6/0016; G02B 6/0066; G02B 6/0073; G02F 1/133608; G02F 1/133603; G02F 1/133606; G02F 2001/133612
USPC ................................. 362/97.1, 97.2
See application file for complete search history.

(56) References Cited

U.S. PATENT DOCUMENTS

| | | | |
|---|---|---|---|
| 5,410,453 A * | 4/1995 | Ruskouski | ............ 362/20 |
| 6,575,611 B2 | 6/2003 | Kugler et al. | |
| 6,611,000 B2 * | 8/2003 | Tamura et al. | ........... 257/80 |
| 7,324,174 B2 * | 1/2008 | Hafuka et al. | ........... 349/61 |
| 7,438,436 B2 * | 10/2008 | Moon | ............ 362/247 |
| 7,445,358 B2 * | 11/2008 | Matsushita | ........... 362/330 |
| 7,455,441 B2 * | 11/2008 | Chosa et al. | ........... 362/608 |
| 7,465,082 B2 * | 12/2008 | Sakamoto et al. | ....... 362/609 |
| 8,029,156 B2 * | 10/2011 | Liou et al. | ............ 362/241 |
| 8,287,158 B2 * | 10/2012 | Hwang | ............ 362/311.01 |
| 2004/0045321 A1 * | 3/2004 | Jousse | ............ 65/183 |
| 2006/0104080 A1 | 5/2006 | Kim et al. | |
| 2006/0164840 A1 | 7/2006 | Song et al. | |
| 2006/0220046 A1 * | 10/2006 | Yu et al. | ............ 257/98 |
| 2007/0002590 A1 | 1/2007 | Jang et al. | |
| 2007/0183137 A1 * | 8/2007 | Iwasaki | ............ 362/97 |
| 2008/0037279 A1 | 2/2008 | Chan | |
| 2008/0094835 A1 * | 4/2008 | Marra et al. | ........... 362/247 |
| 2008/0316391 A1 | 12/2008 | Hsiao | |
| 2009/0067158 A1 | 3/2009 | Hamada | |
| 2009/0073350 A1 | 3/2009 | Toyama et al. | |
| 2009/0096953 A1 | 4/2009 | Tanaka | |
| 2009/0109655 A1 | 4/2009 | Shinozaki | |
| 2009/0109686 A1 * | 4/2009 | Cheng et al. | ........... 362/307 |
| 2009/0116222 A1 | 5/2009 | Hamada | |
| 2009/0284956 A1 * | 11/2009 | Gomi et al. | ........... 362/97.3 |
| 2010/0245708 A1 | 9/2010 | Baba et al. | |
| 2010/0265694 A1 | 10/2010 | Kim et al. | |

FOREIGN PATENT DOCUMENTS

| | | |
|---|---|---|
| JP | 2007-42320 A | 2/2007 |
| JP | 2008-166304 A | 7/2008 |
| WO | WO 2010/150883 A1 | 12/2010 |

\* cited by examiner

*Primary Examiner* — Sharon Payne
(74) *Attorney, Agent, or Firm* — Birch, Stewart, Kolasch & Birch, LLP

(57) ABSTRACT

A display device includes a display panel, a backlight unit disposed at the back of the display panel, and a back cover disposed at the back of the backlight unit, wherein the backlight unit including a base layer, a plurality of substrates disposed on the base layer and separated from each other, and light sources disposed on the substrates.

18 Claims, 21 Drawing Sheets

(a)

(b)

DISPLAY DEVICE

This application claims the benefit of Korean Patent Application No. 10-2011-0000965 filed on Jan. 5, 2011, the entire contents of which is incorporated herein by reference for all purposes as if fully set forth herein.

BACKGROUND

1. Field

Embodiments of the invention relate to a display device.

2. Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY

In one aspect, there is a backlight unit including a base layer, a plurality of substrates disposed on the base layer and separated from each other, and light sources disposed on each of the substrates.

In another aspect, there is a display device including a display panel, a backlight unit disposed at the back of the display panel, and a back cover disposed at the back of the backlight unit, wherein the backlight unit including a base layer, a plurality of substrates disposed on the base layer and separated from each other, and light sources disposed on the substrates.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
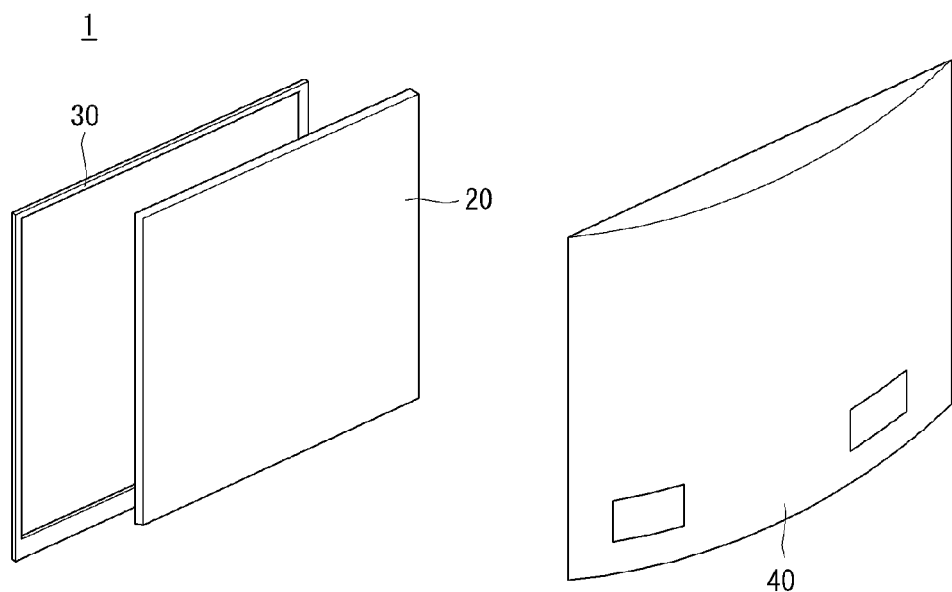
FIG. 1 shows one embodiment of a display device.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Hereinafter, a liquid crystal display panel is used as an example of a display panel. Other display panels may be used. For example, a plasma display panel (PDP), a field emission display (FED) panel, and an organic light emitting diode (OLED) display panel may be used.

FIG. 1 shows one embodiment of a display device 1 which include a front cover 30, a back cover 40, and a display module 20 between the front cover 30 and the back cover 40.

The front cover 30 may cover the display module 20 and may include a front panel (not shown) formed of a substantially transparent material capable of transmitting light. The front panel is positioned over a front surface of the display module 20 to be spaced apart from the front surface of the display module 20 at a predetermined distance, thereby protecting the display module 20 from an external impact.

Figure 2:
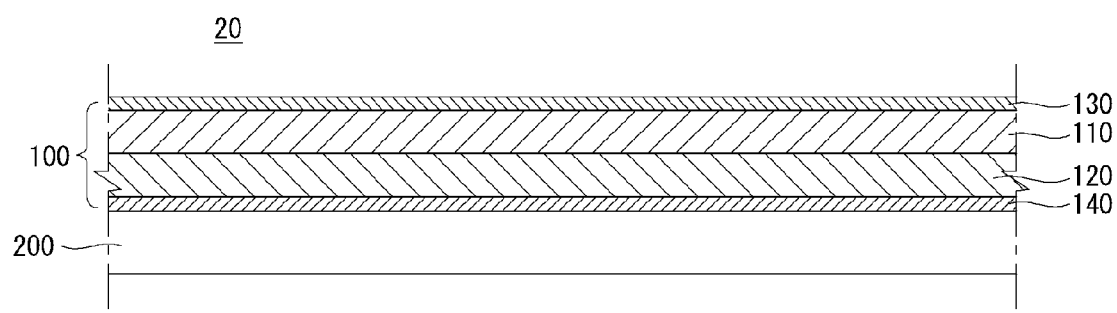
FIG. 2 shows a cross-sectional view of the display device.

FIG. 2 shows a cross-sectional view of the display device in FIG. 1. As shown in FIG. 2, the display module 20 of the display device 1 may include a display panel 100 and a backlight unit 200.

The display panel 100 includes a color filter substrate 110 and a thin film transistor (TFT) substrate 120 that are positioned opposite each other and are attached to each other with a uniform cell gap therebetween. A liquid crystal layer (not shown) may be interposed between the color filter substrate 110 and the TFT substrate 120.

The color filter substrate 110 includes a plurality of pixels each including red (R), green (G), and blue (B) subpixels and may generate a red, green, or blue image when light is applied to the pixels. In this embodiment, each of the pixels includes the red, green, and blue subpixels. Other structures may be used for the pixel. For example, each pixel may include red, green, blue, and white (W) subpixels.

The TFT substrate 120 includes one or more switching elements and may switch on and off corresponding pixel electrodes.

The liquid crystal layer is comprised of liquid crystal molecules. The arrangement of the liquid crystal molecules may vary depending on a voltage difference between a pixel electrode (not shown) and a common electrode (not shown). Hence, light provided by the backlight unit 200 may be incident on the color filter substrate 110 based on changes in the arrangement of the liquid crystal molecules of the liquid crystal layer.

An upper polarizing plate 130 and a lower polarizing plate 140 may be respectively positioned on an upper surface and a lower surface of the display panel 100. More particularly, the upper polarizing plate 130 may be positioned on an upper surface of the color filter substrate 110, and the lower polarizing plate 140 may be positioned on a lower surface of the TFT substrate 120.

A gate driver (not shown) and a data driver (not shown), each of which generates a driving signal for driving the display panel 100, may be provided on the side of the display panel 100. The above-described configuration of the display panel 100 is merely one example; other configurations may be used for the display panel 100.

As shown in FIG. 2, the display module 20 may be configured so that the backlight unit 200 adheres closely to the display panel 100. For example, the backlight unit 200 may be attached and fixed to the lower surface of the display panel 100, more particularly the lower polarizing plate 140. For this, an adhesive layer (not shown) may be formed between the lower polarizing plate 140 and the backlight unit 200.

As described above, because the display device 1 is configured by closely attaching the backlight unit 200 to the display panel 100, the entire thickness of the display device 1 may be reduced. Hence, an external appearance of the display device 1 may be improved.

Further, because a structure for fixing the backlight unit 200 is removed, the structure and the manufacturing process of the display device 1 may be simplified.

Further, because a space between the backlight unit 200 and the display panel 100 is reduced, foreign substances may be prevented from penetrating into the space. Hence, a malfunction of the display device 1 and a reduction in the image quality of the display device 1 resulting from the foreign substances may be prevented.

In this embodiment, the backlight unit 200 may have a structure in which a plurality of functional layers are sequentially stacked, and at least one of the plurality of functional layers may include a plurality of light sources (not shown).

Each of the plurality of functional layers constituting the backlight unit 200 may be formed of a flexible material, so that the backlight unit 200 is closely attached and fixed to the lower surface of the display panel 100. Further, a frame (not shown) for stably positioning the backlight unit 200 may be provided under the backlight unit 200.

The display panel 100 according to one embodiment may be divided into a plurality of regions. Brightness (i.e., brightness of the corresponding light source) of light emitted from a region of the backlight unit 200 corresponding to each of the divided regions of the display panel 100 is adjusted based on a gray peak value or a color coordinate signal of each divided region. Hence, a luminance of the display panel 100 may be adjusted. For this, the backlight unit 200 may operate, so that regions of the backlight unit 200 respectively corresponding to the divided regions of the display panel 100 are dividedly driven.

Figure 3:
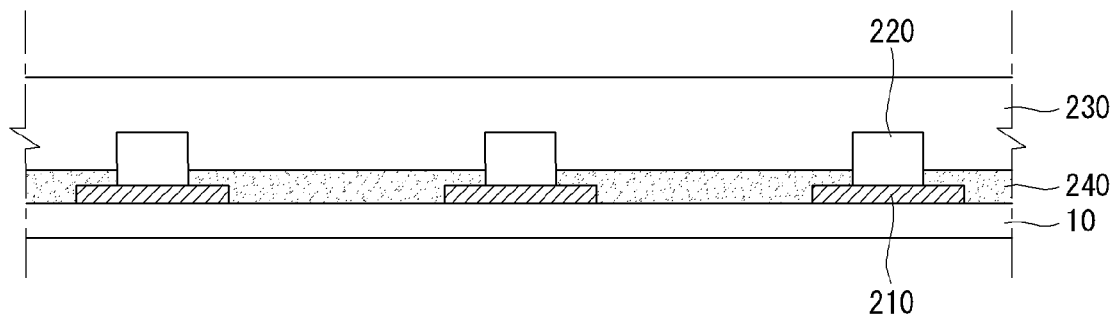
FIG. 3 shows one embodiment of a backlight unit.

FIG. 3 is a cross-sectional view of one embodiment of the backlight unit. As shown in FIG. 3, the backlight unit 200 may include a substrate 210, a plurality of light sources 220, a resin layer 230, and a reflection layer 240.

The plurality of light sources 220 may be formed on the substrate 210, and the resin layer 230 may be formed on the substrate 210 to cover the light sources 220.

A connector (not shown) and an electrode pattern (not shown) for connecting the light sources 220 to one another may be formed on the substrate 210. For example, a carbon nanotube electrode pattern (not shown) for connecting the light sources 220 to the connector may be formed on an upper surface of the substrate 210. The connector may be electrically connected to a power supply unit (not shown) for supplying a power to the light sources 220.

The substrate 210 may be a printed circuit board (PCB) formed of polyethylene terephthalate (PET), glass, polycarbonate (PC), or silicon. Further, the substrate 210 may be a film substrate.

The light source 220 may be one of a light emitting diode (LED) chip and a light emitting diode package having at least one light emitting diode chip. In the embodiment of the invention, the light emitting diode package is described as an example of the light source 220.

The light source 220 may be configured by a colored LED emitting at least one of red light, green light, blue light, etc. or a white LED emitting white light. In addition, the colored LED may include at least one of a red LED, a blue LED, and a green LED. The disposition and emitting light of the light emitting diode may be variously changed within a technical scope of the embodiment.

The resin layer 230 positioned on the substrate 210 transmits light emitted from the light sources 220, and at the same time diffuses the light emitted from the light sources 220, thereby allowing the light sources 220 to uniformly provide the light to the display panel 100.

The reflection layer 240 may be positioned between the substrate 210 and the resin layer 230, more particularly on the upper surface of the substrate 210. The reflection layer 240 may reflect light emitted from the light sources 220 and may again reflect light totally reflected from a boundary between the resin layer 230 and the reflection layer 240, thereby more widely diffusing the light emitted from the light sources 220.

The reflection layer 240 may select a sheet in which a white pigment, for example, titan white is dispersed, a sheet in which a metal deposition layer is stacked on the surface of the sheet, a sheet in which bubbles are dispersed so as to scatter light, etc. among various types of sheets formed of synthetic resin material. Silver (Ag) may be coated on the surface of the reflection layer 240 so as to increase a reflectance. The reflection layer 240 may be formed by coating a resin on the upper surface of the substrate 210.

The resin layer 230 may be formed of various kinds of resins capable of transmitting light. For example, the resin layer 230 may contain one or at least two selected from the group consisting of polyethylene terephthalate (PET), polycarbonate (PC), polypropylene, polyethylene, polystyrene, polyepoxy, silicon, acryl, etc.

Further, a refractive index of the resin layer 230 may be approximately 1.4 to 1.6, so that the backlight unit 200 has a uniform luminance by diffusing light emitted from the light sources 220.

The resin layer 230 may contain a polymer resin having an adhesion so as to tightly and closely adhere to the light sources 220 and the reflection layer 240. For example, the resin layer 230 may contain an acrylic resin such as unsaturated polyester, methyl methacrylate, ethyl methacrylate, isobutyl methacrylate, normal butyl methacrylate, normal butylmethylmethacrylate, acrylic acid, methacrylic acid, hydroxy ethylmethacrylate, hydroxy propylmethacrylate, hydroxy ethylacrylate, acrylamide, methylol acrylamide, glycidyl methacrylate, ethylacrylate, isobutylacrlate, normal butylacrylate, 2-ethylhexyl acrylate polymer, copolymer, or terpolymer, etc., an urethane resin, an epoxy resin, a melamine resin, etc.

The resin layer 230 may be formed by coating and curing a liquid or gel-type resin on the upper surface of the substrate 210 on which the light sources 220 and the reflection layer 240 are formed. Alternatively, the resin layer 230 may be separately manufactured and then may be attached to the upper surface of the substrate 210.

As a thickness of the resin layer 230 increases, light emitted from the light sources 220 may be more widely diffused. Hence, the backlight unit 200 may provide light having the uniform luminance to the display panel 100. However, as the thickness of the resin layer 230 increases, an amount of light absorbed in the resin layer 230 may increase. Hence, the luminance of light which the backlight unit 200 provides to the display panel 100 may entirely decrease. Accordingly, the thickness of the resin layer 230 may be approximately 0.1 mm to 4.5 mm, so that the backlight unit 200 can provide light having the uniform luminance to the display panel 100 without an excessive reduction in the luminance of light.

Figure 4:
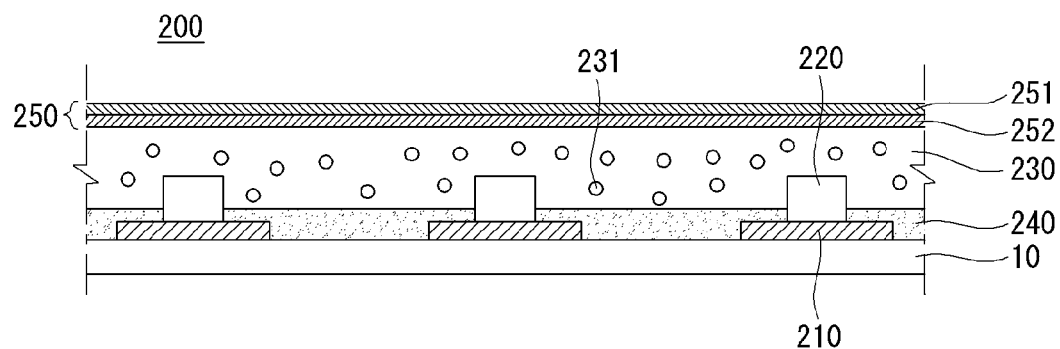
FIG. 4 shows another embodiment of a backlight unit.

FIG. 4 shows another embodiment of the backlight unit. In this embodiment, the plurality of light sources 220 may be mounted on the substrate 210, and the resin layer 230 may be disposed on the upper surface of the substrate 210. The reflection layer 240 may be formed between the substrate 210 and the resin layer 230.

The resin layer 230 may include a plurality of scattering particles 231. The scattering particles 231 may scatter or refract light incident on the resin layer 230, thereby more widely diffusing light emitted from the light sources 220.

The scattering particles 231 may be formed of a material having a refractive index different from a formation material of the resin layer 230 so as to scatter or refract the light emitted from the light source 220. More particularly, the scattering particles 231 may be formed of a material having a refractive index greater than silicon-based resin or acrylic resin forming the resin layer 230.

For example, the scattering particles 231 may be formed of polymethylmethacrylate (PMMA)/styrene copolymer (MS), polymethylmethacrylate (PMMA), polystyrene (PS), silicon, titanium dioxide (TiO2), and silicon dioxide (SiO2), or a combination thereof. Further, the scattering particles 231 may be formed of a material having a refractive index less than the formation material of the resin layer 230.

For example, the scattering particles 231 may be formed by generating bubbles in the resin layer 230. Other materials may be used for the scattering particles 231. For example, the scattering particle 231 may be formed using various polymer materials or inorganic particles.

In this embodiment, scattering particles 231 may be formed of a material having a refractive index than less a formation material of resin layer 230. For example, the scattering particles 231 may be formed by forming bubbles in the resin layer 230. A formation material of the scattering particles 231 is not limited to the above-described material and may be formed of various polymer materials or various inorganic materials.

In one embodiment, the resin layer 230 may be formed by mixing the liquid or gel-type resin with the scattering particles 231 and then coating and curing a mixture on the upper surface of the substrate 210 on which the light sources 220 and the reflection layer 240 are formed.

As shown in FIG. 4, an optical sheet 250 may be disposed on the top of the second layer 230. The optical sheet 250 may include at least one prism sheet 251 and/or at least one diffusion sheet 252. In this instance, a plurality of sheets constituting optical sheet 250 are not separated from one another and are attached to one another. Thus, the thickness of the optical sheet 250 or the thickness of the backlight unit 200 may be reduced.

A lower surface of the optical sheet 250 may closely adhere to the resin layer 230, and an upper surface of the optical sheet 250 may closely adhere to the lower surface of the display panel 110, i.e., the lower polarizing plate 140.

The diffusion sheet 252 may diffuse incident light to thereby prevent light coming from the resin layer 230 from being partially concentrated. Hence, the diffusion sheet 252 may further uniformize the luminance of light. Further, the prism sheet 251 may focus light coming from the diffusion sheet 252, thereby allowing the light to be vertically incident on the display panel 110.

In one embodiment, at least one of the prism sheet 251 and diffusion sheet 252 constituting the optical sheet 250 may be removed. The optical sheet 250 may further include other functional layers in addition to the prism sheet 251 and the diffusion sheet 252.

In a backlight unit which performs direct light emissions, an LED package constituting the light sources 220 may be classified into a top view type LED package and a side view type LED package based on a facing direction of a light emitting surface of the LED package.

FIGS. 5 to 8 illustrate a backlight unit which performs direct light emissions. More specifically, FIGS. 5 and 6 respectively illustrate a top view type LED package and a side view type LED package in the direct light emitting manner of the backlight unit.

Figure 5:
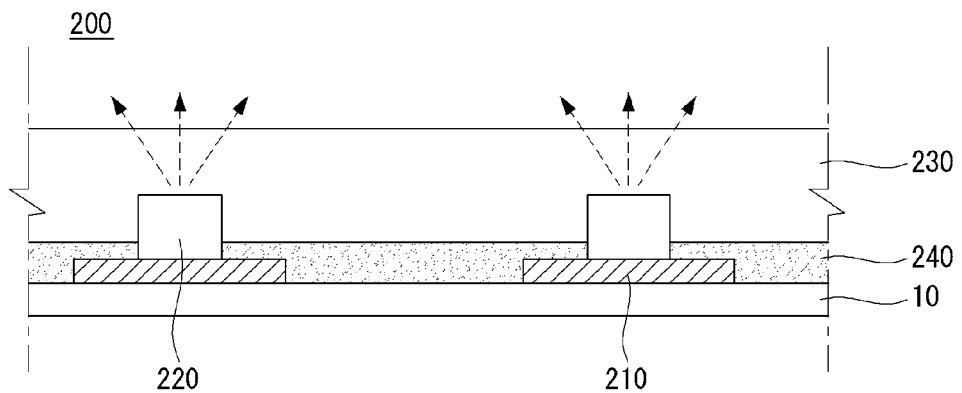
FIGS. 5 to 8 show backlight unit which performs direct light emission.

As shown in FIG. 5, each of the plurality of light sources 220 of the backlight unit 200 has a light emitting surface on an upper surface of each light source 220. Thus, the plurality of light sources 220 may emit light in an upward direction, for example, in a direction perpendicular to the substrate 210 or the reflection layer 240.

Figure 6:
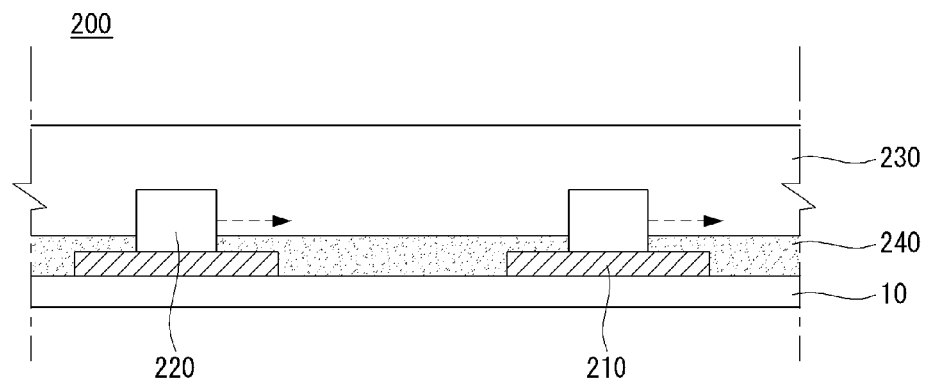

As shown in FIG. 6, each of the plurality of light sources 220 of the backlight unit 200 has the light emitting surface at the side of each light source 220. Thus, the plurality of light sources 220 may emit light in a lateral direction, for example, an extension direction of the substrate 210 or the reflection layer 240. For example, the plurality of light sources 220 may be configured using the side view type LED package. As a result, it is possible to reduce a problem that the light sources 220 are observed as a hot spot on the screen of the display panel 100. Furthermore, the thin profile of the display device 1 may be achieved because of a reduction of the thickness "a" of the resin layer 230.

Figure 7:
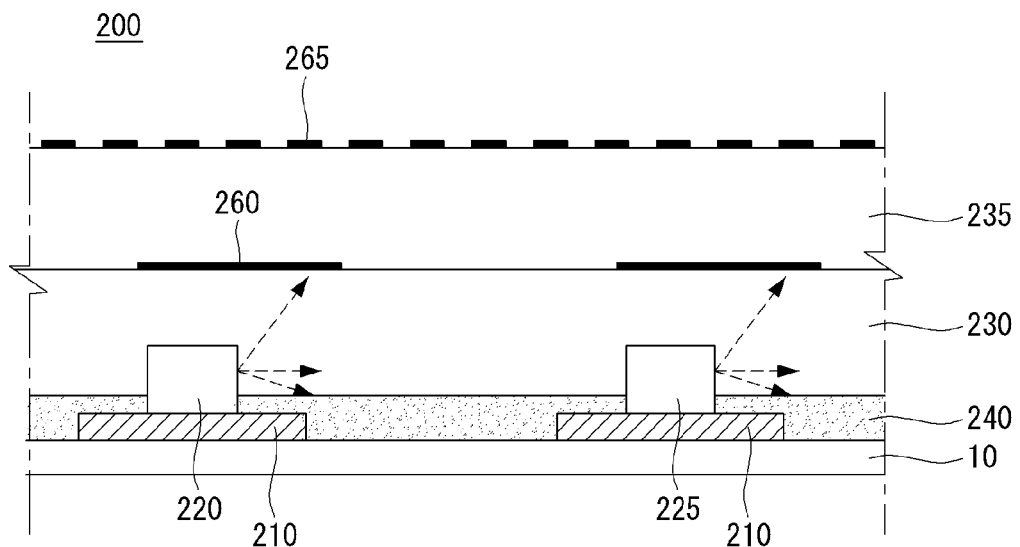

As shown in FIG. 7, the backlight unit 200 may include a plurality of resin layers 230 and 235. As shown in FIG. 7, light emitted from the side of the light source 220 may be transmitted by the first resin layer 230 and may travel in a formation area of a light source 225 adjacent to the light source 220.

A portion of light transmitted by the first resin layer 230 may be emitted in an upward direction corresponding to a direction of the display panel 100. For this, the first resin layer 230 may include a plurality of scattering particles 231 as described above with reference to FIG. 4 and may scatter or refract light travelling in the upward direction A portion of light emitted from the light source 220 may be incident on the reflection layer 240, and the light incident on the reflection layer 240 may be reflected and diffused in the upward direction.

A large amount of light may be emitted in an area around the light source 220 because of a strong scattering phenomenon around the light source 220 or light emitted from the light source 220 in a direction similar to the upward direction. Hence, light having a high luminance may be observed on the screen.

To prevent this, as shown in FIG. 7, a first light shielding pattern 260 may be formed on the first resin layer 230 to reduce a luminance of light emitted in an area around the light source 220. Hence, the backlight unit 200 may emit light having the uniform luminance. For example, the first light shielding pattern 260 may be formed on the first resin layer 230 corresponding to the formation area of the plurality of light sources 220 to shield a portion of light from the light source 220 and to transmit a portion of the remaining light. Hence, the first light shielding pattern 260 may reduce the luminance of light emitted upward.

The first light shielding pattern 260 may be formed of titanium dioxide (TiO2). In this instance, the first light shielding pattern 260 may reflect downward a portion of light from the light source 220 and may transmit a portion of the remaining light.

In one embodiment, a second resin layer 235 may be disposed on the first resins layer 230. The second resin layer 235 may be formed of the same material as or a different material from the first resins layer 230. The second resin layer 235 may diffuse light upward emitted from the first resins layer 230, thereby improving the uniformity of the luminance of light from the backlight unit 200.

The second resin layer 235 may be formed of a material having a refractive index equal to or different from the refractive index of the formation material of the first resins layer 230. When the second resin layer 235 is formed of the material having the refractive index greater than the refractive index of the first resins layer 230, the second resin layer 235 may widely diffuse light from the first resin layer 230.

When the second resin layer 235 is formed of the material having the refractive index less than the refractive index of the first resin layer 230, light from the first resin layer 230 may increase a reflectance of light reflected from a lower surface of the second resin layer 235. Hence, light from the light source 220 may easily travel along the first resin layer 230.

Each of the first resin layer 230 and the second resin layer 235 may include a plurality of scattering particles. In this instance, a density of the scattering particles of the second resin layer 235 may be greater than a density of the scattering particles of the first resin layer 230. When the second resin layer 235 includes the scattering particles having the density greater than the first resin layer 230, the second resin layer 235 may widely diffuse light upward emitted from the first resin layer 230. Hence, the uniformity of the luminance of light from the backlight unit 200 may be improved.

As shown in FIG. 7, a second light shielding pattern 265 may be formed on the second resin layer 235 to uniformize the luminance of light from the second resin layer 235. For example, when light upward emitted from the second resin layer 235 is concentrated in a specific portion and thus is observed on the screen as the light having the high luminance, the second light shielding pattern 265 may be formed in an area corresponding to a specific portion of an upper surface of the second resin layer 235. Hence, because the second light shielding pattern 265 may reduce the luminance of light in the specific portion, the luminance of light emitted from the backlight unit 200 may be uniform.

The second light shielding pattern 265 may be formed of titanium dioxide (TiO2). In this instance, the second light shielding pattern 265 may reflect downward a portion of light from the second resin layer 235 and may transmit a portion of the remaining light.

Figure 8:
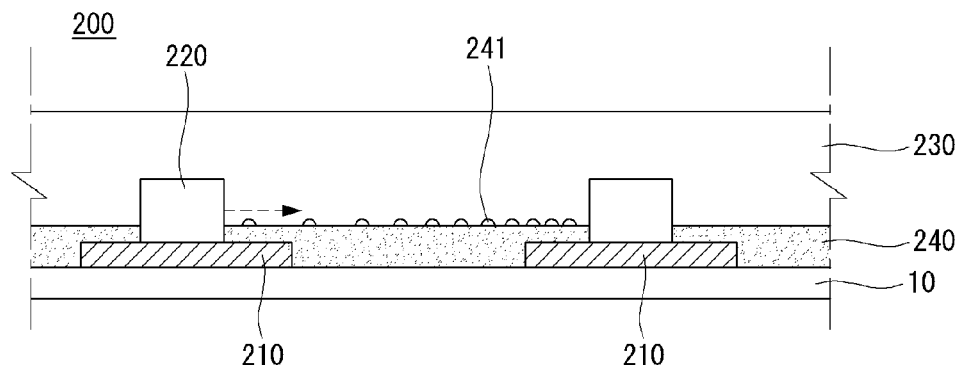

As shown in FIG. 8, a pattern may be formed on the reflection layer 240, thereby facilitating a travel of light emitted from the light source 220 to the light source 225 adjacent to the light source 220. The pattern on an upper surface of the reflection layer 240 may include a plurality of protrusions 241. Light that is emitted from the light source 220 and then is incident on the plurality of protrusions 241 may be scattered or refracted in a direction indicated by an arrow of FIG. 8.

As shown in FIG. 8, a density of the protrusions 241 formed on the reflection layer 240 may increase as a separated distance between the protrusions 241 and the light source 220 increases (i.e., as the protrusions 241 are close to the light source 225). Hence, a reduction in a luminance of upward emitted light in an area distant from the light source 220 (i.e., in an area near to the light source 225) may be prevented. As a result, the luminance of light provided by the backlight unit 200 may be uniformized.

The protrusions 241 may be formed of the same material as the reflection layer 240. In this instance, the protrusions 241 may be formed by processing the upper surface of the reflection layer 240. Alternatively, the protrusions 241 may be formed of a material different from the reflection layer 240. In this instance, the protrusions 241 may be formed by printing the pattern on the upper surface of the reflection layer 240. The shape of the protrusions 241 is not limited to a shape shown in FIG. 8 and may be variously changed. For example, other shapes such as a prism shape may be used.

FIGS. 9 to 20 are views for explaining in more detail the backlight unit and display device according to the present invention. It is noted that the description of parts which have been described in detail above will be omitted. For example, the light shielding pattern 260, protrusions, etc. that have been described in detail above can be applied to the following configuration. Also, light sources 220 to be described below may be at least one of a side-view type and a top-view type.

Figure 9:
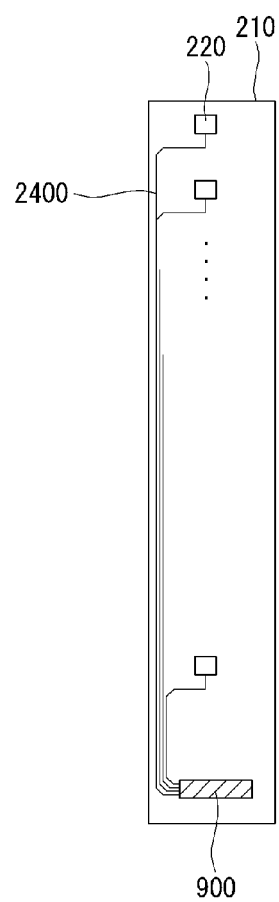
FIGS. 9 to 20 are views for explaining in more detail the backlight unit and display device according to the present invention.

Referring to FIG. 9, a plurality of light sources 220 may be disposed on a substrate 210. For example, a plurality of light sources 210 can be disposed in a stripe type on a substrate 210. In other words, a plurality of light sources 220 can be disposed in a straight line on a substrate 210.

Moreover, a transmission line 2400 for transmitting a driving signal supplied from an external driver may be formed on the substrate 220. The transmission line 2400 may be an electrode pattern.

The transmission line 2400 or electrode pattern of this type has been described above in FIG. 3.

In addition, a connector 900 for connecting a cable (not shown) may be disposed on the substrate 210 to electrically connect an external driver to the substrate 210 where the light sources 220 are disposed.

A plurality of substrates 210 of this type may be disposed on a base layer.

Figure 10:
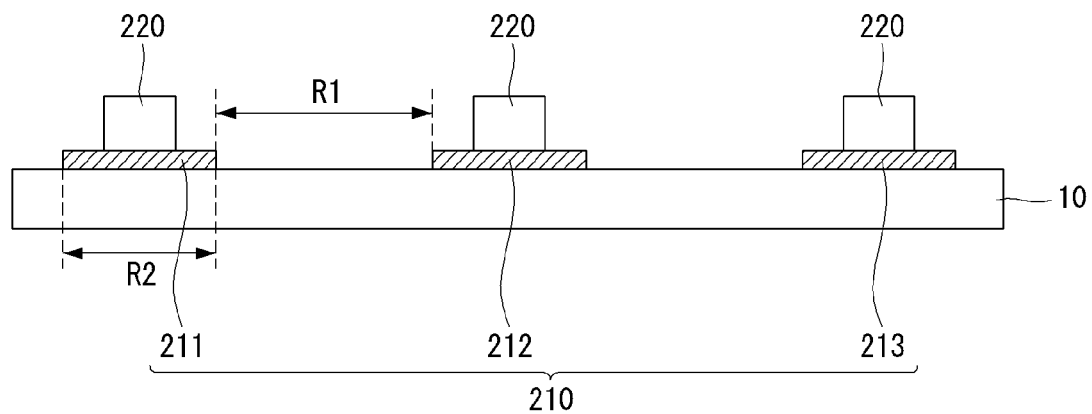

For example, as shown in FIG. 10, a plurality of substrates 210 may be disposed, separated from each another, on the base layer 10. Preferably, a plurality of substrates 210 may be disposed in parallel, separated from each other, on the base layer 10.

Referring to FIG. 10, the first substrate 211, second substrate 212, and third substrate 213, among the plurality of substrates 210, may be disposed, separated from each other at a predetermined distance, on the base layer 10.

Here, the distance between two adjacent substrates 210, for example, the gap R1 between the first substrate 211 and the second substrate 212, may be greater than the width of one substrate 210, for example, the width R2 of the first substrate 211.

In contrast to the present invention, a comparative example in which the base layer 10 is not used will be described below with reference to FIG. 11.

Figure 11:
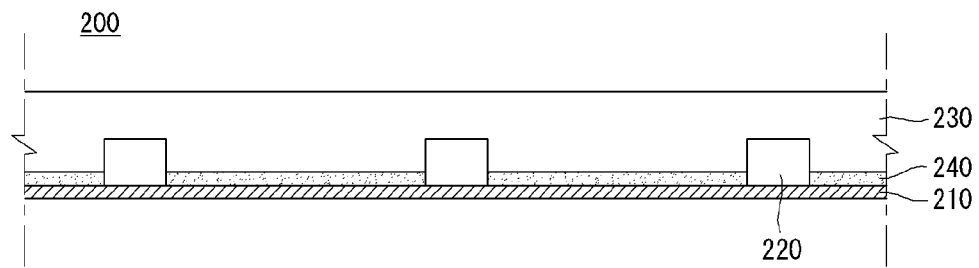

Referring to FIG. 11, in a display device according to the comparative example, a plurality of light sources 220 may be disposed on a substrate 210. Also, a reflection layer 240 may be disposed on top of the substrate 210, and a resin layer 230 may be disposed on top of the reflection layer 240.

In this case, the size of the substrate 210 may be excessively increased, and accordingly the manufacturing cost may be excessively increased, and the workability of an operation for disposing/forming a plurality of light sources 220 and transmission lines 2400 on the substrate 210 may become poor.

On the other hand, in the case that a plurality of substrates 210 are disposed on the base layer 10 as in the present invention, the size of the respective substrates 210 may be reduced, thereby lowering the manufacturing cost. Also, the workability of a manufacturing process of the respective substrates 210 may be excellent because the number of transmission lines 2400 and light sources 220 formed/disposed on the respective substrates 210 in the manufacturing process is relatively small.

Moreover, the base layer 10 may be made of a rather cheap material because the transmission lines 2400 and the lights sources 220 are formed on the base layer 10, thereby further reducing the manufacturing cost.

Figure 12:
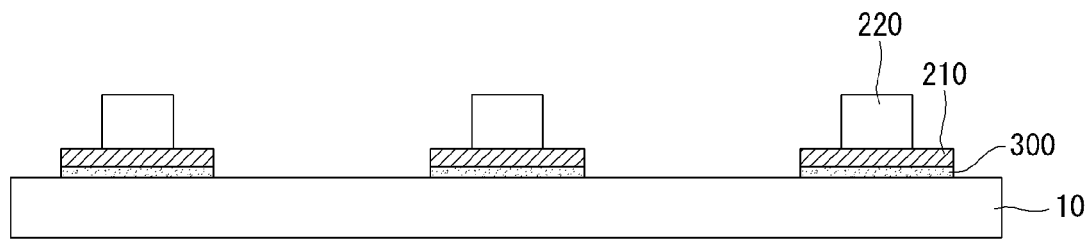

Referring to FIG. 12, an adhesive layer 300 may be disposed between the base layer 10 and the substrates 210. The adhesive layer 300 can attach the substrates 210 to the base layer 10, and also can transmit light generated from the substrates 210 and/or the light sources 200 to the base layer 10. To this end, the adhesive layer 300 can include a thermally conductive material, for example, metal particles.

Figure 13:
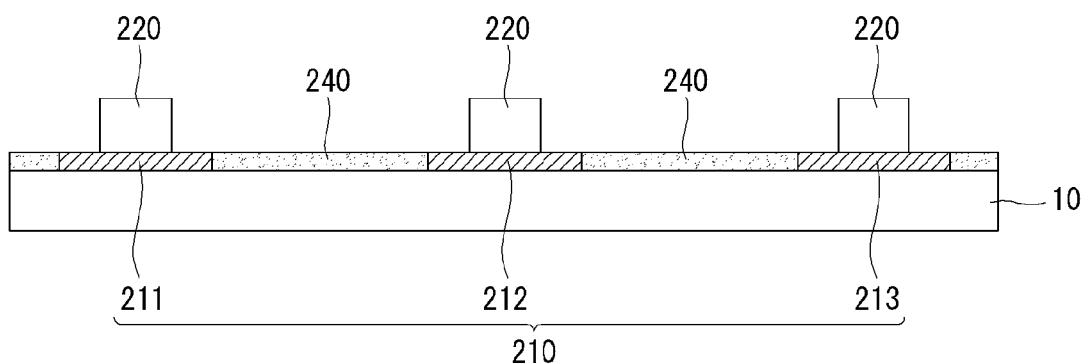

Referring to FIG. 13, the reflection layer 240 may include portions disposed on the surface of the base layer 10. For example, the reflection layer 240 may include portions disposed in the area between two adjacent substrates 210.

Figure 14:
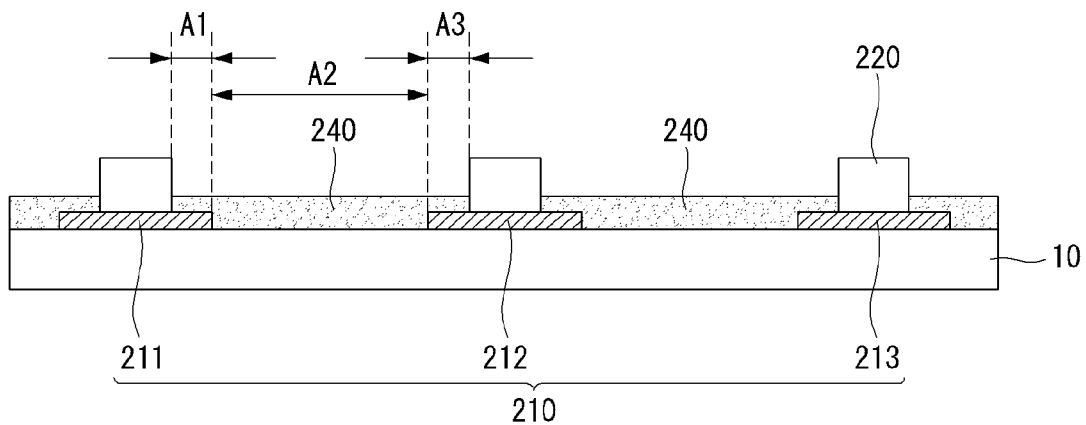

Alternatively, as shown in FIG. 14, the reflection layer 240 may include portions A2 disposed on the surface of the base layer 10 and portions A1 and A3 overlapping with the substrates 210. Here, the portions A1 and A3 overlapping with the substrates 210 may be portions disposed on the surfaces of the substrates 210. Also, the portions A2 disposed on the surface of the base layer 10 may be portions overlapping with the base layer 10. The portions A2 of the reflection layer 240 overlapping with the base layer 10 may be in contact with the base layer 10.

In this case, the width of the portions A2 of the reflection layer 240 disposed on the surface of the base layer 10 may be greater than the width of the portions A1 and A3 overlapping with the substrates 210.

Meanwhile, the plurality of light sources 220 disposed on the substrates 210 may be arranged in various patterns.

Figure 15:
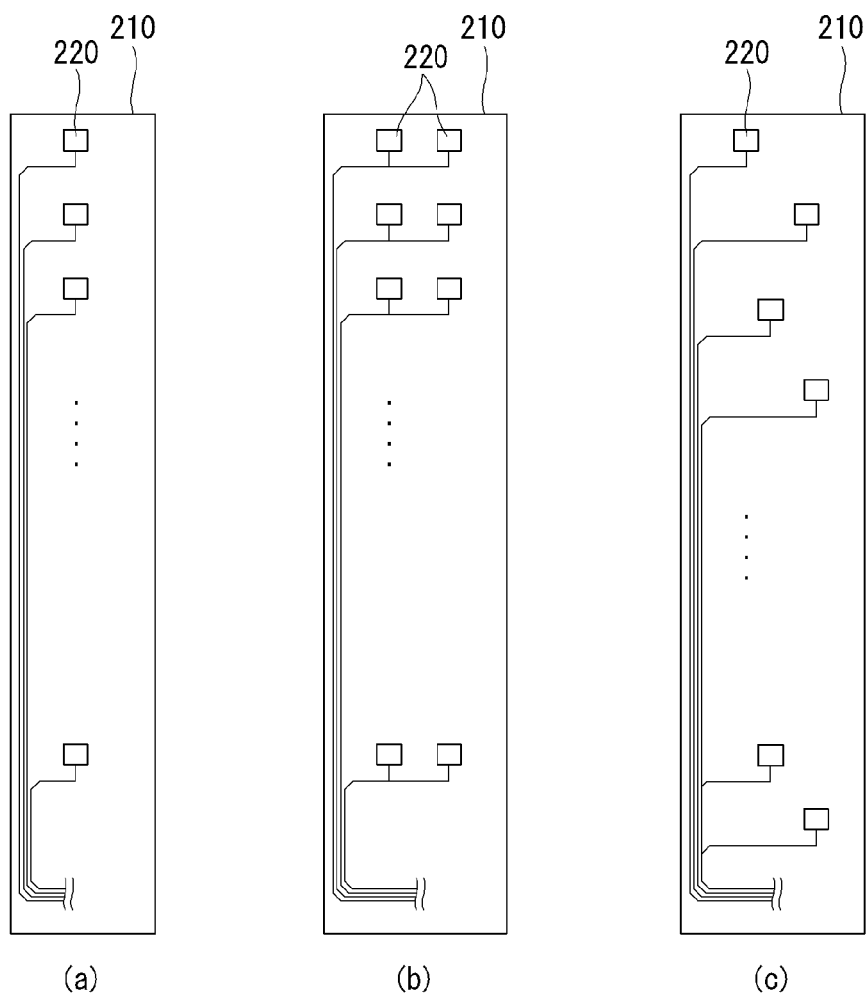

For example, as shown in (A) of FIG. 15, a plurality of light sources 220 may be disposed in a straight line on a substrate 210. In this case, it can be viewed that the plurality of light sources 220 disposed on the substrate 210 are arranged in a vertical direction DRV.

Alternatively, as shown in (B) of FIG. 15, a plurality of light sources 220 may be arranged along a plurality of rows on a substrate 210. In this case, it can be viewed that at least two light sources 220 are arranged on the substrate 210 in the vertical direction DRV, and at least two of the remaining light sources 220 are arranged thereon in a horizontal direction DRH. Here, it is not necessary for the vertical direction DRV and the horizontal direction DRH to be orthogonal.

Alternatively, as shown in (C) of FIG. 15, it can be viewed that at least two light sources 220 are arranged on the substrate 210 in the vertical direction DRV, and at least two of the remaining light sources 220 are arranged in a diagonal direction between the vertical direction DRV and the horizontal direction DRH. In this case, it can be viewed that the plurality of light sources 220 are arranged in a zigzag form.

Figure 16:
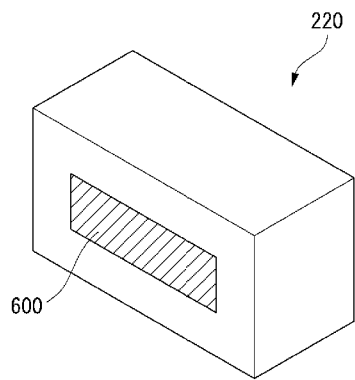

As shown in FIG. 16, the light source 220 may include a light emitting face 600 for emitting light. As a predetermined light can be emitted from the light emitting face 600, the direction toward which the light emitting face 600 faces can be regarded as a light emitting direction.

Figure 17:
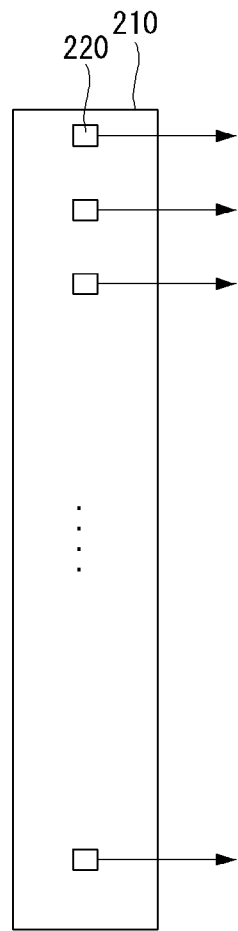

Referring to FIG. 17, the light emitting directions of the plurality of light sources 220 disposed on a substrate 210 may be all the same. For example, if the light sources 220 are of the side-view type, light sources 220 for emitting light in the same direction may be disposed on a predetermined substrate 220.

Alternatively, the light emitting directions of the light sources 220 disposed on two predetermined substrates 210 among the plurality of light sources 220 may be different. In other words, the light emitting direction of the light sources disposed on the first substrate among the plurality of substrates 210 may be different from the light emitting direction of the light sources disposed on the second substrate, which is different from the first substrate.

Figure 18:
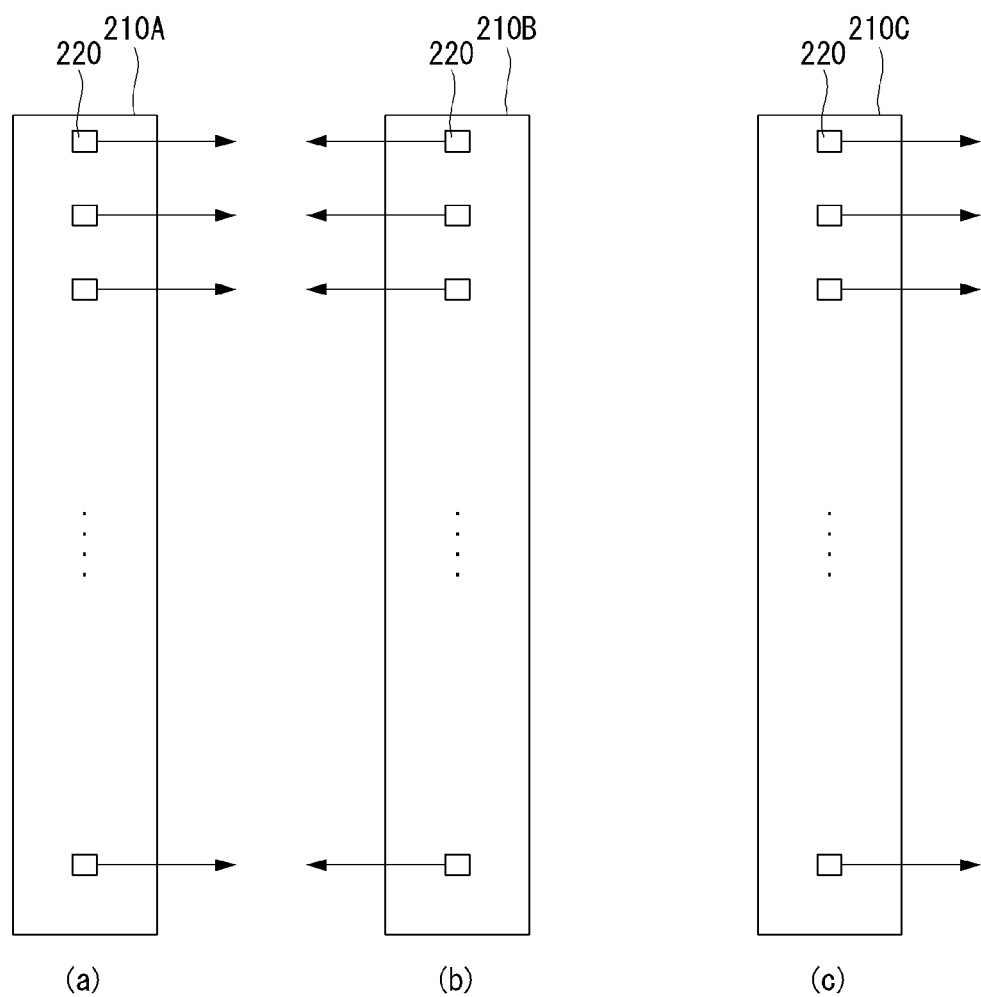

For example, as shown in FIG. 18, the first light sources 221 disposed on the first substrate 210A among the plurality of substrates 210 may emit light in the first direction DR1, and the second light sources 222 disposed on the second substrate 210B adjacent to the first substrate 210A may emit light in the second direction DR2 different from the first direction DR1. Here, the first direction DR1 and the second direction DR2 may be opposite to each other.

Moreover, the third light sources 223 disposed on the third substrate 210C adjacent to the second substrate 210B may emit light in the first direction DR1.

In this case, it is possible to prevent a noise image of a specific pattern from being displayed on a screen along the light emitting direction.

As such, if the light emitting directions of the light sources 220 disposed on different substrates 210 are different from each other, the gaps between the substrates 210 may be different.

Figure 19:
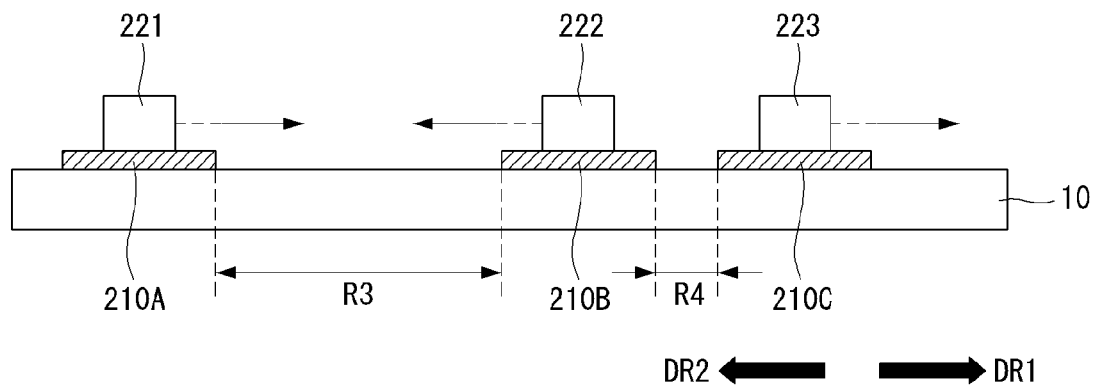

For example, as shown in FIG. 19, in the case that the first light sources 221 disposed on the first substrate 210A emit light in the first direction DR1, i.e., the direction facing the second substrate 210B, the second light sources 222 disposed on the second substrate 210B emit light in the second direction DR2 different from the first direction DR1, i.e., the direction facing the first substrate 210A, and the third light sources 223 disposed on the third substrate 210C adjacent to the second substrate 210B emit light in the first direction DR1, i.e., the direction becoming distant from the second substrate 210B, the gap R3 between the first substrate 210A and the second substrate 210B may be greater than the gap R4 between the second substrate 210B and the third substrate 210C.

In this case, it is possible to prevent a noise image of a specific pattern from being displayed on a screen along the light emitting direction, and to prevent a hot-spot phenomenon in which the luminance of a specific region is higher than the luminance of other regions.

Alternatively, the light emitting direction of at least one of the plurality of light sources 220 disposed on a substrate 210 may be different from the light emitting direction of at least one of the remaining light sources 220.

Figure 20:
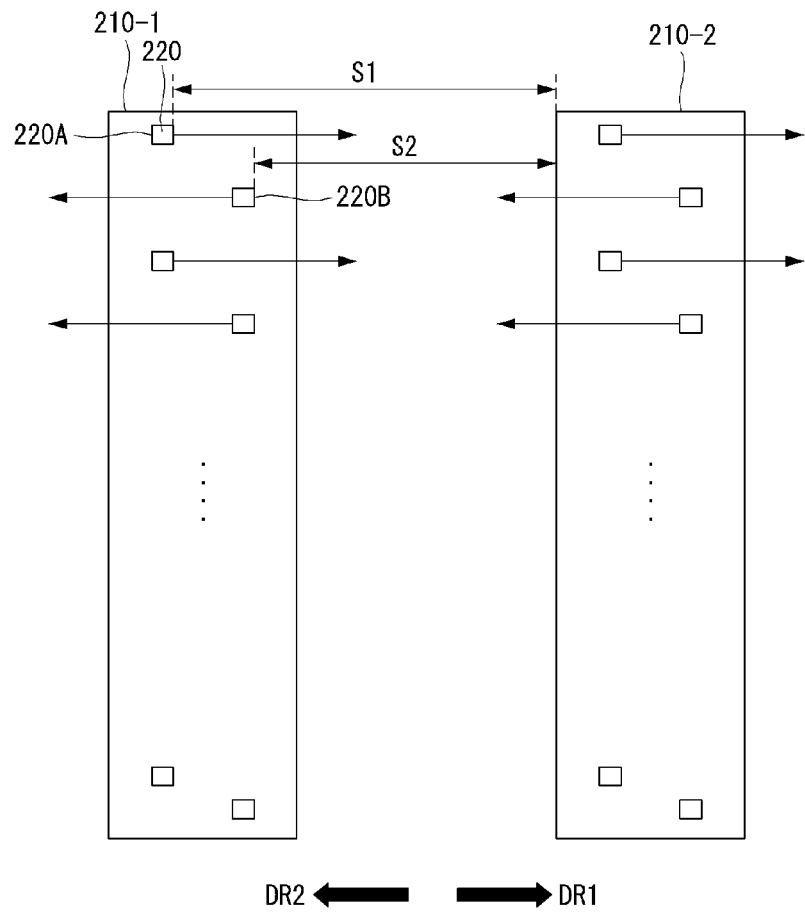

For example, as shown in FIG. 20, the first light source 220A disposed on the first substrate 210-1 may emit light in the first direction DR1, and the second lights source 220B may emit light in the second direction DR2 different from the first direction DR1.

Here, if the gap S1 between the first light source 220A and the second substrate 210-2 adjacent to the first substrate 210-1 is greater than the gap S2 between the second light source 220B and the second substrate 210-2, the first light source 220A may emit light in the direction facing the second substrate 220B, and the second light source 220B may emit light in the direction becoming distant from the second substrate 220B.

FIGS. 21 to 33 are views for explaining in more detail the base layer. It is noted that the description of parts which have been described in detail above will be omitted.

The thickness of the base layer 10 may vary according to its position.

Figure 21:
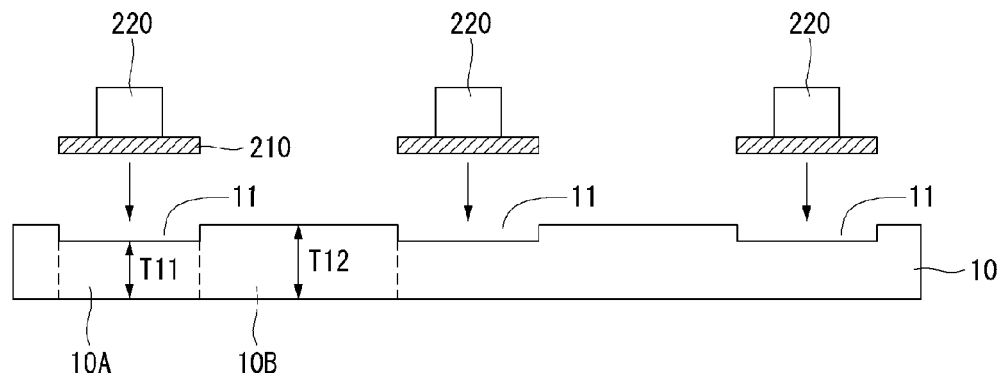
FIGS. 21 to 33 are views for explaining in more detail a base layer.

For example, as shown in FIG. 21, the thickness T12 of the base layer 10 at a position corresponding to the region between two adjacent substrates 210 may be greater than the thickness T11 of the base layer 10 in the region overlapping with the substrate 210. In other words, the thickness T11 of the first portion 10A of the base layer 10 overlapping with the substrate 210 may be less than the thickness T12 of the second portion 10B not overlapping with the substrate 210.

To this end, a plurality of grooves 11 may be formed in the base layer 10, and the respective substrates 210 may be positioned in the grooves 11.

In this way, in the case that the grooves 11 are formed in the base layer 10, and the substrates 210 are inserted into the grooves 11, the substrates 210 may be fixed to the base layer 10 without the use of any adhesive layer. Therefore, the adhesive layer between the base layer 10 and the substrates 210 may be omitted.

Figure 22:
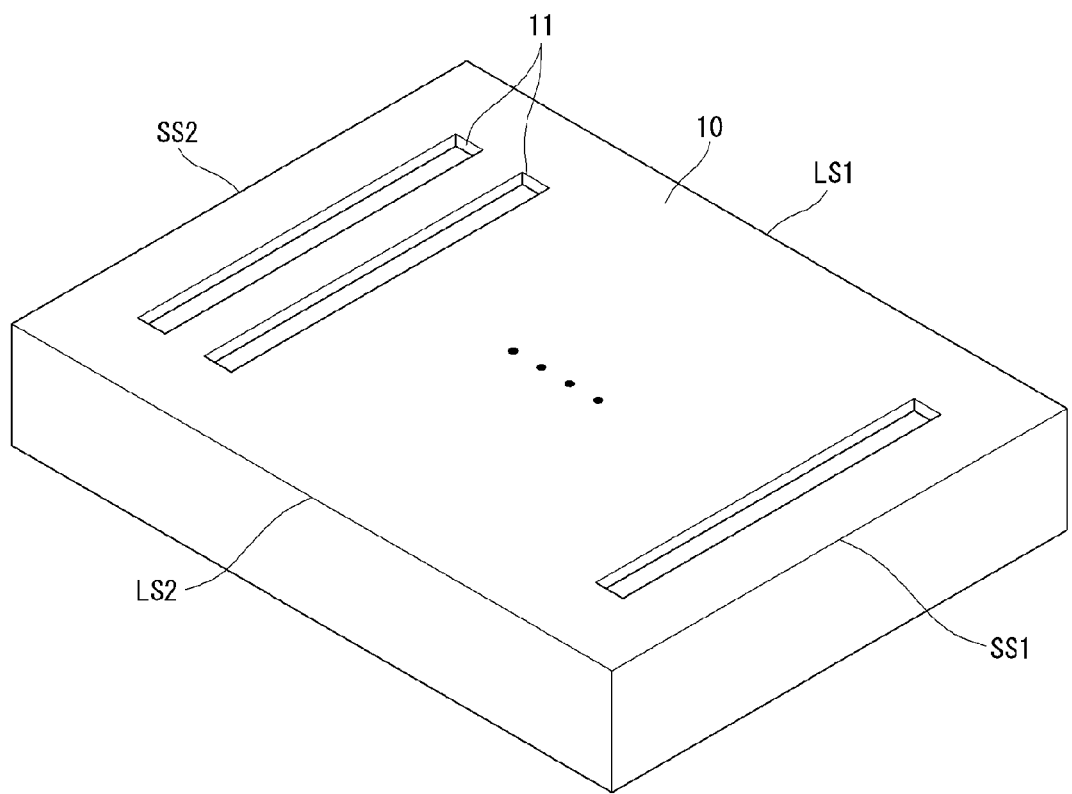

As such, in order to fix the plurality of substrates 210 to the base layer 10, the plurality of grooves 11 may be formed in parallel in the base layer 10 as shown in FIG. 22.

For example, it is assumed that the base layer 10 has an approximately rectangular shape, and the base layer 10 includes a first long side LS1, a second long side LS2 facing the first long side LS1, a second short side SS2 adjacent to the first long side LS1 and the second long side LS2, and a first short side SS1 facing the second short side SS2. In this case, the plurality of grooves 11 may be formed in parallel to the first and second short sides SS1 and SS2 of the base layer 10.

Figure 23:
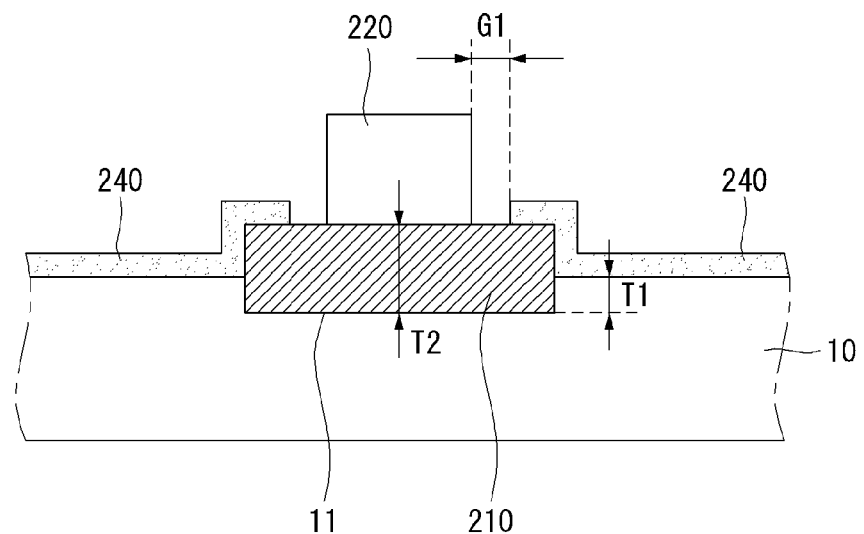

Here, the depth of the grooves 11 may be less than the height of the substrates 210. For example, as shown in FIG. 23, the depth T1 of the groove 11 formed in the base layer 10 may be less than the height T2 of the substrate 210 inserted into the groove 11. In this case, the substrate 210 may be protruded by a predetermined height from the base layer 10.

Moreover, the reflection layer 240 may include portions positioned on the surface of the base layer 10 and portions positioned on the surface of the substrate 210. Also, the reflection layer 240 may be spaced apart by a predetermined distance G1 from the light source 220.

Figure 24:
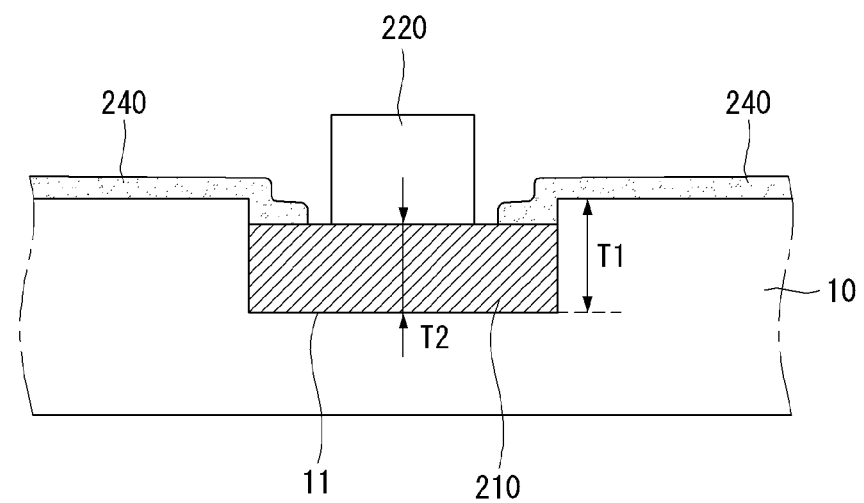

Alternatively, as shown in FIG. 24, the depth T1 of the groove 11 formed in the base layer 10 may be greater than the height T2 of the substrate 210 inserted into the groove 11. In this case, the substrate 210 may be positioned lower than the surface of the base layer 10.

Even with this structure, the reflection layer 240 may include portions positioned on the surface of the base layer 10 and portions positioned on the surface of the substrate 210.

Figure 25:
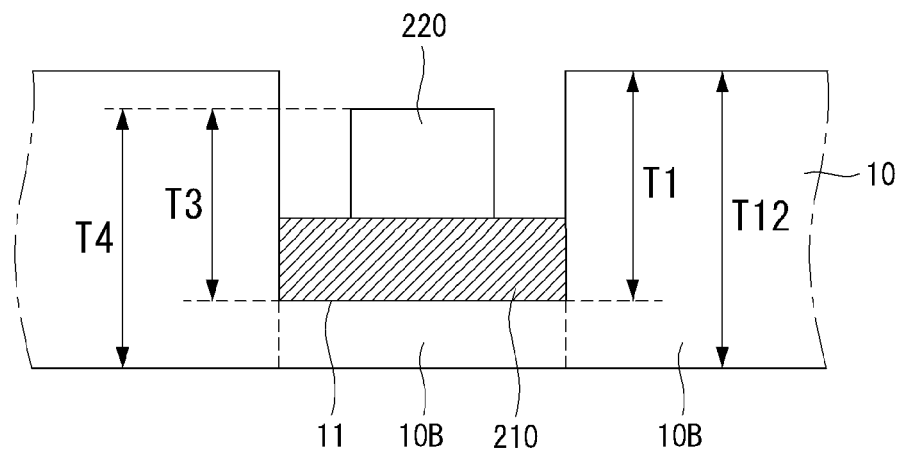

Alternatively, as shown in FIG. 25, if the depth T1 of the groove 11 is further increased, the depth T1 of the grooves 11 may be greater than the height T4 from the bottom of the substrate 210 to the top of the light source 220. That is, the depth T1 of the groove 11 may be greater than the height T3 measured from the bottom of the substrate 220 to the top of the light source 220. Moreover, the thickness T12 of the second portion 10B of the base layer 10 is greater than the distance T4 from the bottom of the base layer 10 to the top of the light source 220.

Figure 26:
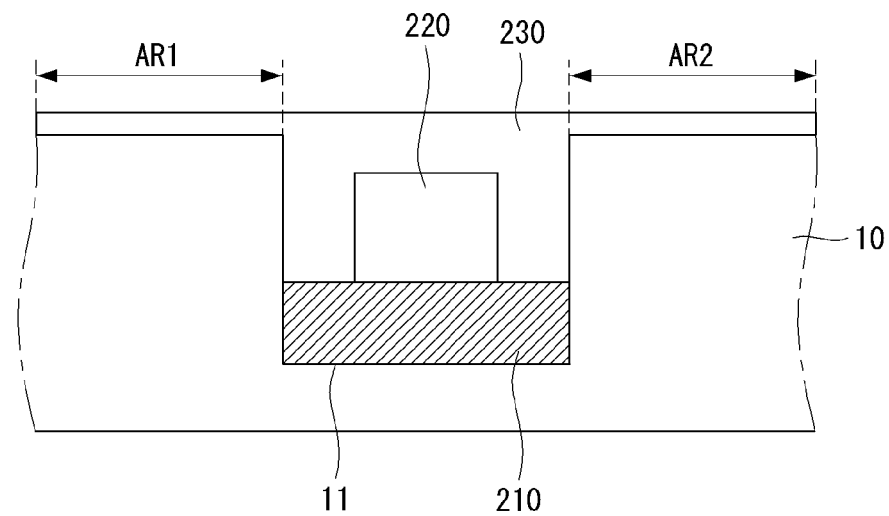

With this structure, as shown in FIG. 26, it is possible to form a resin layer 230 surrounding the substrate 210 and the light source 220.

In this case, the resin layer 230 may include a portion positioned within the groove 11.

Moreover, the resin layer 230 may include portions AR1 and Ar2 positioned on top of the base layer 10. In this case, part of the resin layer 230 may be in contact with the base layer 10. For example, the portions AR1 and AR2 of the resin layer 230 positioned on top of the base layer 10 may be in contact with the base layer 10.

With this structure, in the case that the light source 220 is the side-view type that emits light laterally, the base layer 10 may be formed of a substantially transparent material.

Meanwhile, the resin layer 230 may include a recessed portion in the region corresponding to the groove 11 of the base layer 10.

Figure 27:
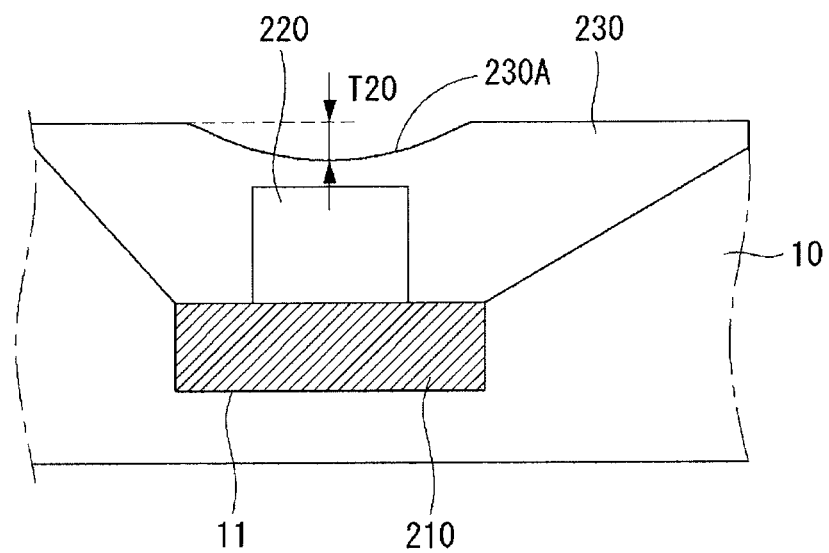

For example, as shown in FIG. 27, the resin layer 230 may include a recessed portion 230A whose surface is recessed by a predetermined depth T20 toward the bottom of the base layer 10. In this case, light emitted from the light sources 220 may be diffused more widely due to the difference in the reflective index among a plurality of functional layers positioned on top of the light source 220.

Figure 28:
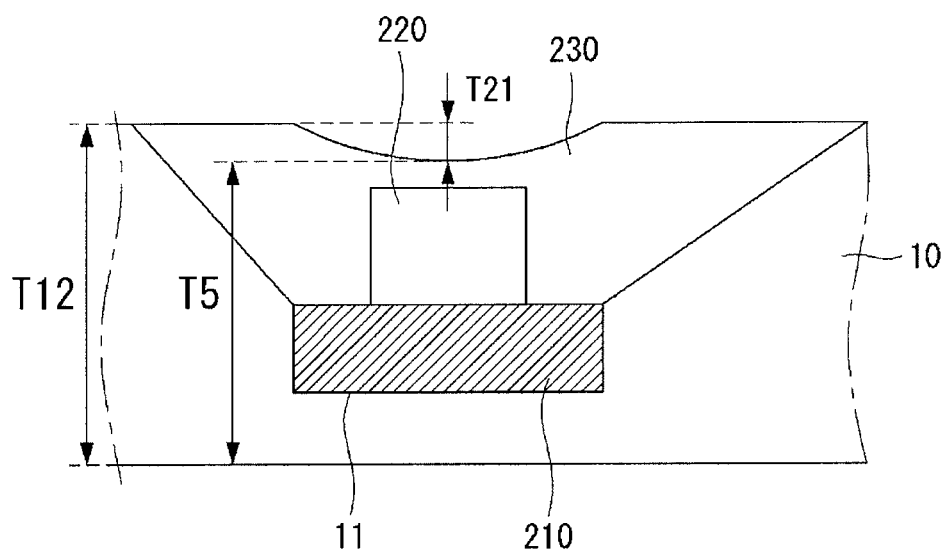

Alternatively, as shown in FIG. 28, the resin layer 230 may include a portion in which the depth T5 measured from the bottom of the base layer 10 to the surface of the resin layer 230 is less than the maximum thickness T12 of the base layer 10. In other words, the resin layer 230 may include a portion lowered by a predetermined depth T21 from the surface of the base layer 10.

In this case, the resin layer 230 may be positioned substantially within the groove 11 of the base layer 10. Also, the portions of the base layer 10, other than the groove 11, may not be blocked by the resin layer 230.

Meanwhile, the base layer 10 may include a portion whose thickness gradually changes in the region between two adjacent substrates 210. Here, a groove 11 where the substrate 210 is disposed may be formed in the base layer 10, or the groove 11 may not be formed therein. The following description will be made under the assumption that the groove 11 is formed in the base layer 10.

Figure 29:
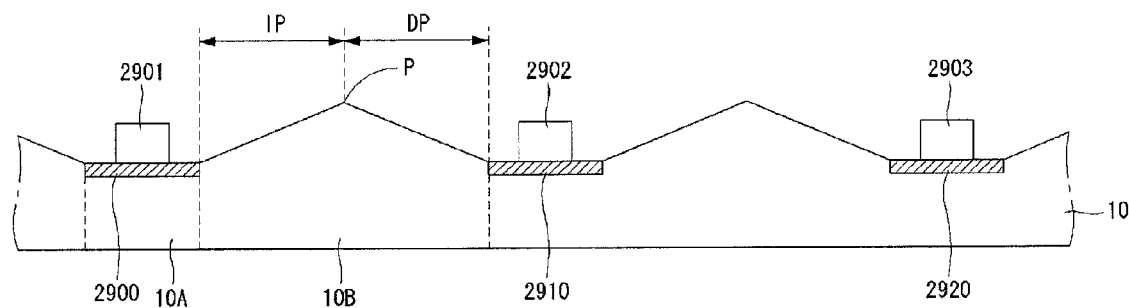

For example, as shown in FIG. 29, the second portion 10B disposed in the region between the first substrate 2900 and second substrate 2910 disposed on the base layer 10 may include a portion whose thickness gradually increase from the first portion 10A toward the center P of the second portion 10B. Here, the thickness of the base layer 10 may increase as the left region IP of the second portion 10B goes from the first substrate 2900 toward the center P of the second portion 10B, and the thickness of the base layer 10 may increase as the right region DP of the second portion 10B goes from the second substrate 2910 toward the center P of the second portion 10B.

Alternatively, when the position at which the thickness of the second portion 10B of the base layer 10 is maximum, i.e., the position having the maximum thickness in the region between the first substrate 2900 and second substrate 2910 on the base layer 10 is referred to as the first position P, the second portion 10B may include a portion whose thickness increases toward the first position P.

With this structure, the light sources 220 may emit light in the direction facing the second portion 10B of the base layer 10.

Figure 30:
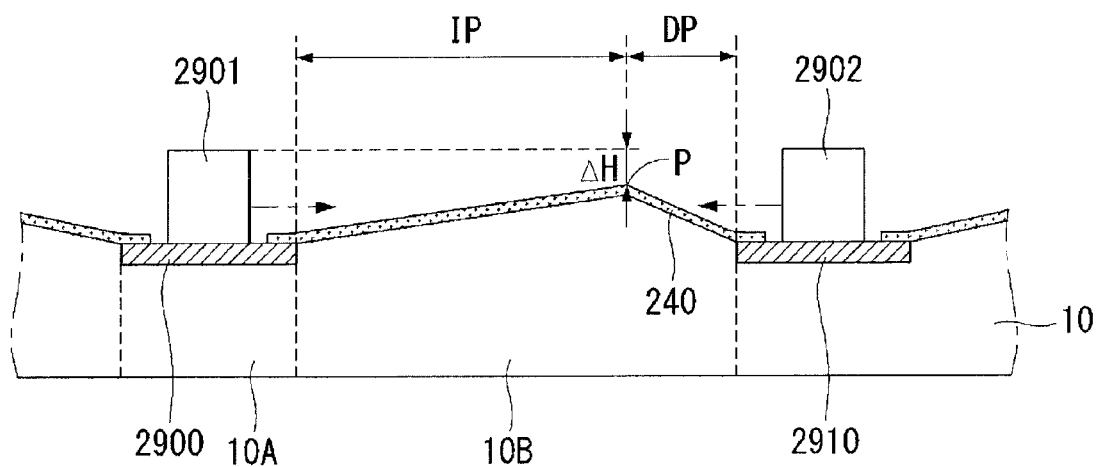

For example, as shown in FIG. 30, the first light source 2901 disposed on the first substrate 2900 may emit light in the direction facing the left region IP of the second portion 10B, and the second light source 2902 disposed on the second substrate 2910 may emit light in the direction facing the right region DP of the second portion 10B.

In this case, the light emitted from the first light source 2901 and the light emitted from the second light source 2902 may be reflected toward the front (the direction in which an image is displayed) in the portion of the reflection layer 240 corresponding to the second portion 10B of the base layer 10, and accordingly the optical characteristics may be improved. More specifically, the loss of the light emitted from the first light source 2901 and the second light source 2902 can be reduced, thus improving luminance and enhancing light efficiency.

Moreover, the height of the position at which the thickness of the second portion 10B of the base layer 10 is maximum, i.e., the first position, may be less than the maximum height of the light sources 220. That is, the height measured from the bottom of the base layer 10 to the top of the first position P of the second portion 10B may be less than the height measured from the bottom of the base layer 10 to the top of the light sources 220. In this case, a hot spot phenomenon where light is concentrated at the first position P may be reduced.

Figure 31:
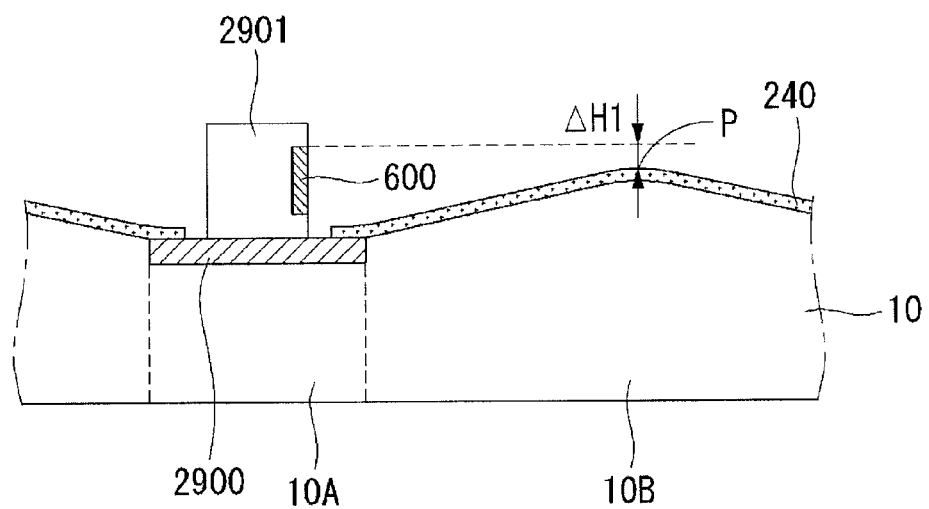

More specifically, as shown in FIG. 31, the maximum height of the light emitting face 600 of the light source 220 measured from the bottom of the base layer 10, i.e., the first light source 2901, may be greater than the height measured from the bottom of the base layer 10 to the top of the first position P of the second portion 10B.

Figure 32:
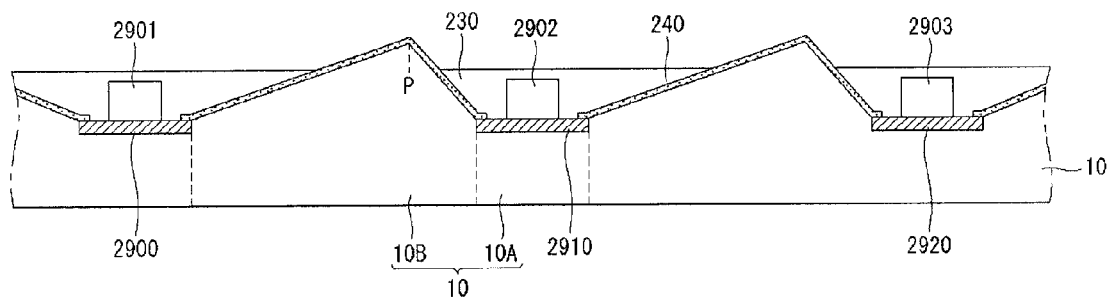

Alternatively, as shown in FIG. 32, the height of the position at which the thickness of the second portion 10B of the base layer 10 is maximum, i.e., the first position, may be greater than the maximum height of the light sources 220. That is, the height measured from the bottom of the base layer 10 to the top of the first position P of the second portion 10B may be greater than the height measured from the bottom of the base layer 10 to the top of the light sources 220.

In this case, the resin layer 230 covering the substrates 2900 to 2920 and the light sources 2901 to 2903 may not be positioned at the first position P of the second portion 10B of the base layer 10. In other words, the second portion 10B may include portions not covered by the resin layer 230. Also, the reflection layer 240 may include portions not covered by the resin layer 230.

Figure 33:
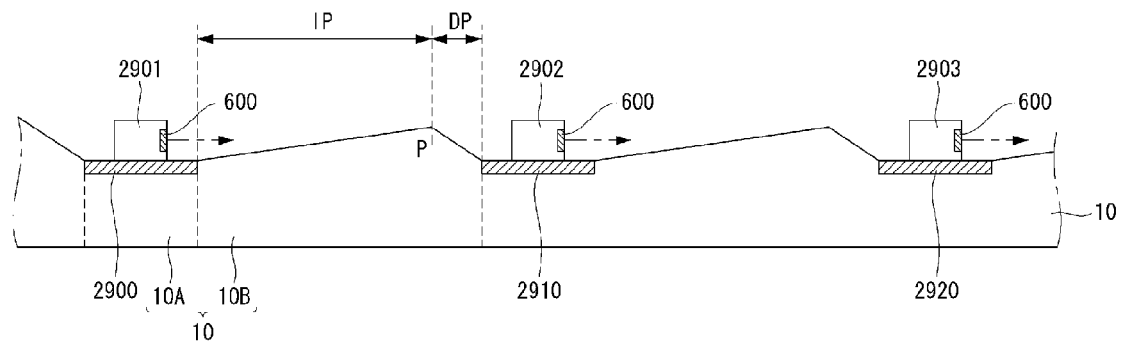

Alternatively, as shown in FIG. 33, the rate of change in thickness per unit distance of the base layer 10 between the first position P of the second portion 10B of the base layer 10 and the first substrate 2900 may be less than the rate of change in thickness per unit distance of the base layer 10 between the first position P and the second substrate 2910. In other words, the slope of the base layer 10 between the first position P of the second portion 10B of the base layer 10 and the first substrate 2900 is slower than the slope of the base layer 10 between the first position P and the second substrate 2910.

In this case, the first light source 2901 disposed on the first substrate 2900 may emit light in the direction facing the second portion 10B, and the second light source 2902 disposed on the second substrate 2910 may emit light in the direction becoming distant from the first light source 2901.

In this case, the optical characteristics may be further improved.

FIGS. 34 to 38 are views for explaining in more detail the configuration of the display device according to the present invention. It is noted that the description of parts which have been described in detail above will be omitted.

Figure 34:
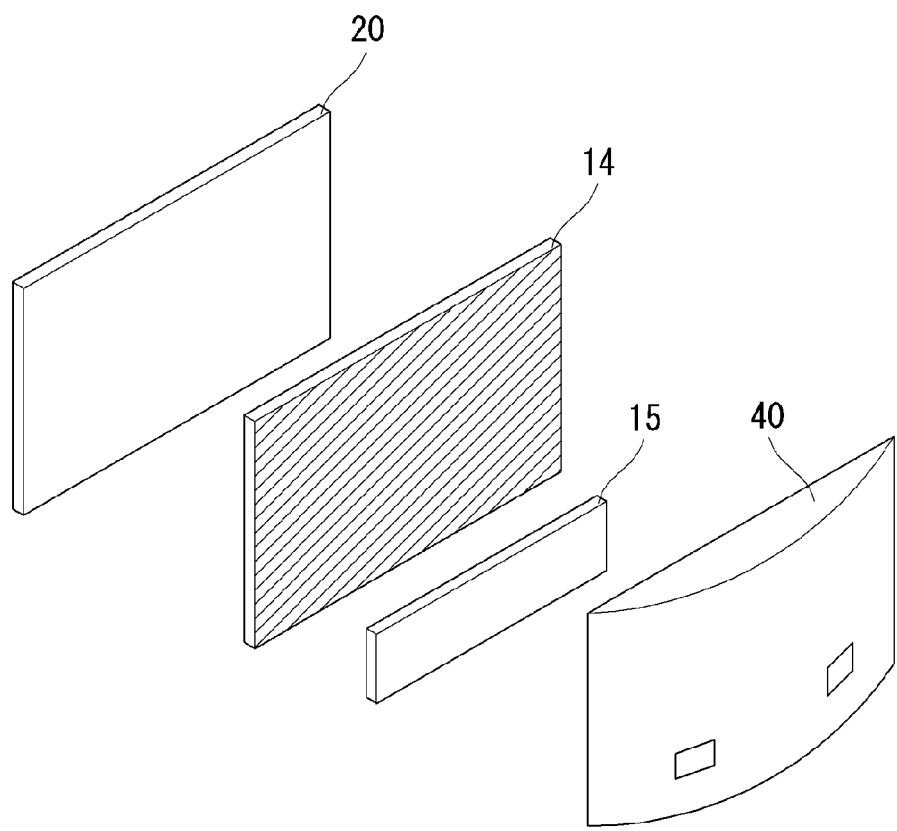
FIGS. 34 to 38 are views for explaining in more detail the configuration of the display device according to the present invention.

Referring to FIG. 34, the display device according to the present invention may include a display module 20, a frame 14, a driving board 15, and a back cover 40.

The display module 20 has been previously described in detail.

The frame 140 may be disposed at the back of the display module 20, more specifically, at the back of a backlight unit 200. The frame 14 can provide a holding power for supporting the backlight unit 200.

The driving board 15 may be disposed at the back of the frame 14. The driving board 15 can supply a driving signal to the electrodes of a display panel 10 included in the display module 20. Also, the driving board 15 can supply a driving signal to the backlight unit 200. Specifically, the driving board 15 can supply a driving signal to the light sources 220 of the backlight unit 200.

The back cover 40 may be disposed at the back of the driving board 15.

Figure 35:
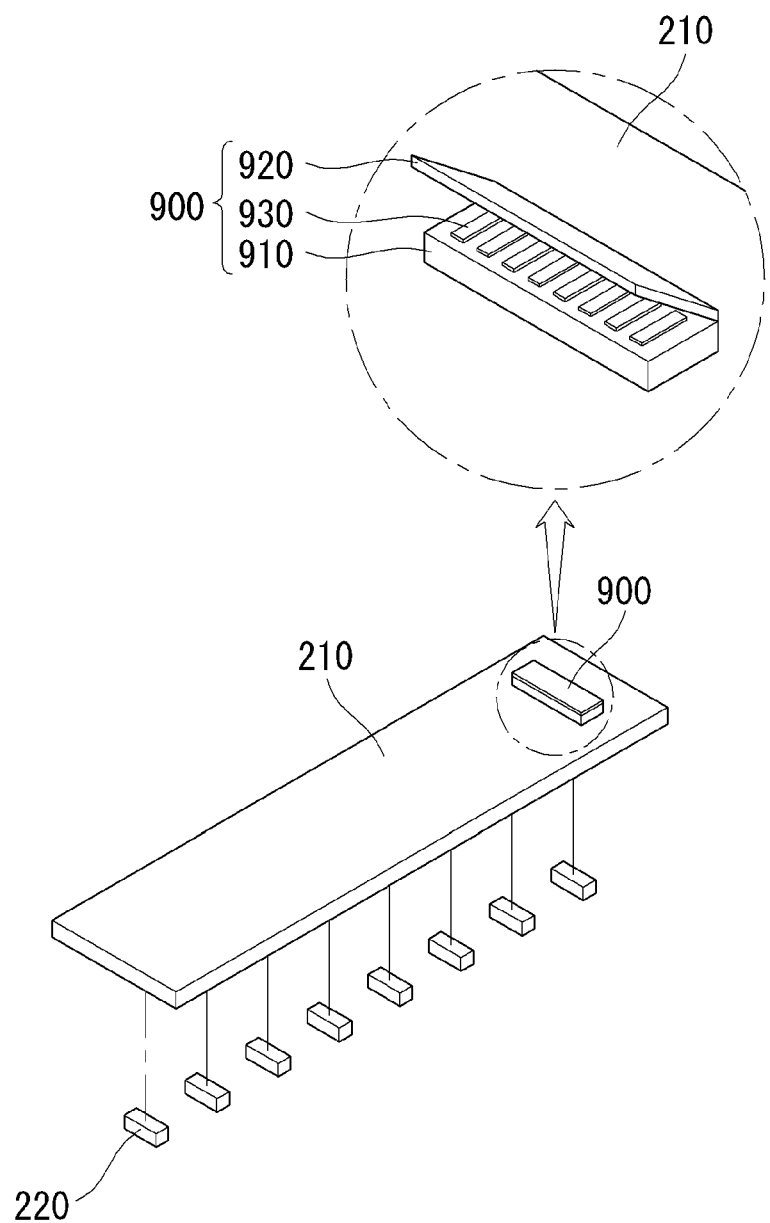

Moreover, as shown in FIG. 35, the light sources 220 may be disposed at the front surface of the substrate 210, and a connector 900 may be disposed at the back of the substrate 210.

The connector 900 may be electrically connected to at least one light source 220 disposed at the front surface of the substrate 210. Accordingly, the connector 900 electrically connects an external driver, i.e., a driving circuit, though not shown, and the light sources 220, thereby enabling the driving circuit to supply a driving voltage to the light sources 220.

In addition, the connector 900 may include a first portion 910, a first electrode 930, and a second portion 920. Here, the first portion 910 may be fixed to the back surface of the substrate 210. The first electrode 930 may be formed on the first portion 910, and connected to a cable (not shown). The second portion 920 may apply pressure such that the cable is electrically attached to the first electrode 930. Furthermore, the cable electrically connected to the first electrode 930 is brought into electrical contact with an external driving circuit, and as a result, the light source 220 and the external driving circuit may be electrically connected to each other FIG. 35 illustrates one example of the structure of the connector 900, and the present invention is not limited to the connector 900 of FIG. 35. For instance, in the present invention, the second portion 920 may be omitted, and the cable not shown may be attached to the first portion 910 with an anisotropic adhesive containing conductive balls. In this case, the first electrode 930 of the connector 900 and the cable may be electrically connected to each other by the conductive balls.

Figure 36:
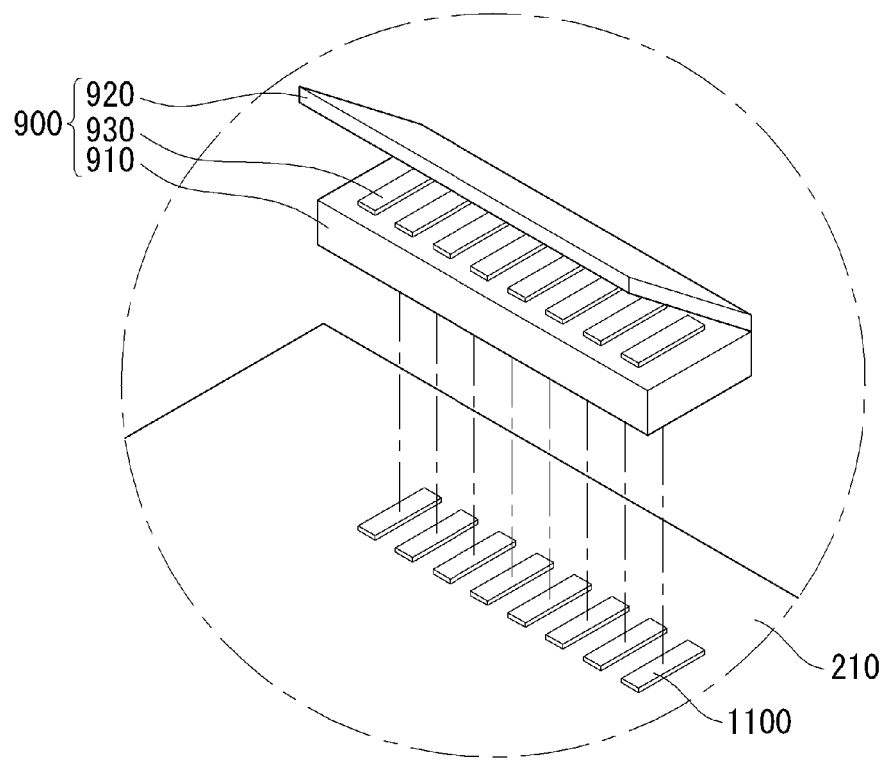
Figure 36:
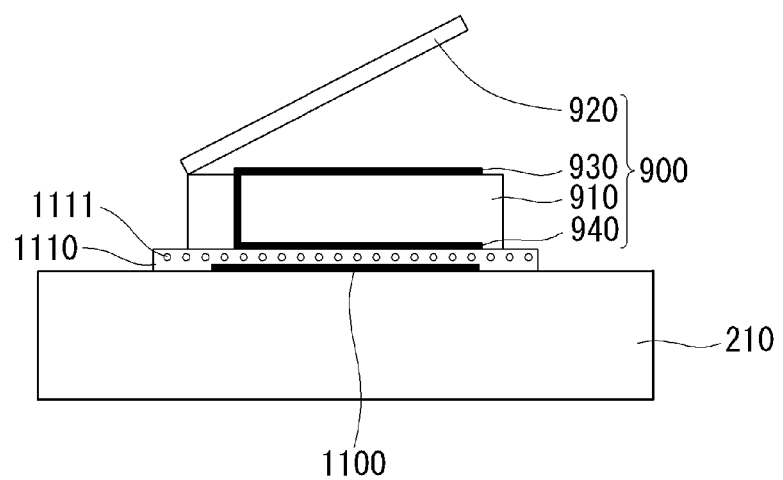

Alternatively, as shown in FIG. 36, the connector 900 may be electrically connected to the second electrode 1100 formed on the substrate 210. Specifically, the second electrode 1100 may be formed on the back surface of the substrate 210, and the third electrode 940 may be formed on the bottom face of the first portion 910. The second electrode 1100 and the third electrode 940 may be electrically connected.

As such, in order to electrically connect the third electrode 940 of the connector 900 and the second electrode 1100 formed on the substrate 210, an adhesive layer 1110 may be formed between the connector 900 and the back surface of the substrate 210, and the adhesive layer 1110 may contain conductive particles 1111. Here, the conductive particles 1111 may be conductive balls, and, although not shown, may consist of a core made of a metallic material, such as silver Ag, and a coating coated around the core. The coating may include a material, such as carbon.

The third electrode 940 of the connector 900 and the second electrode 1100 formed on the substrate 210 may be electrically connected by the conductive particles 1111 contained in the adhesive layer 1110.

Moreover, the first electrode 930 and second connector 940 of the connector 900 may be connected to each other.

In addition, the second electrode 1100 disposed on the back surface of the substrate 210 may be electrically connected to the light sources 220 disposed on the front surface of the substrate 210.

Accordingly, when the cable is connected to the first electrode 930 of the connector 900, the light sources 220 disposed on the front surface of the substrate 210 and the cable can be electrically connected.

Figure 37:
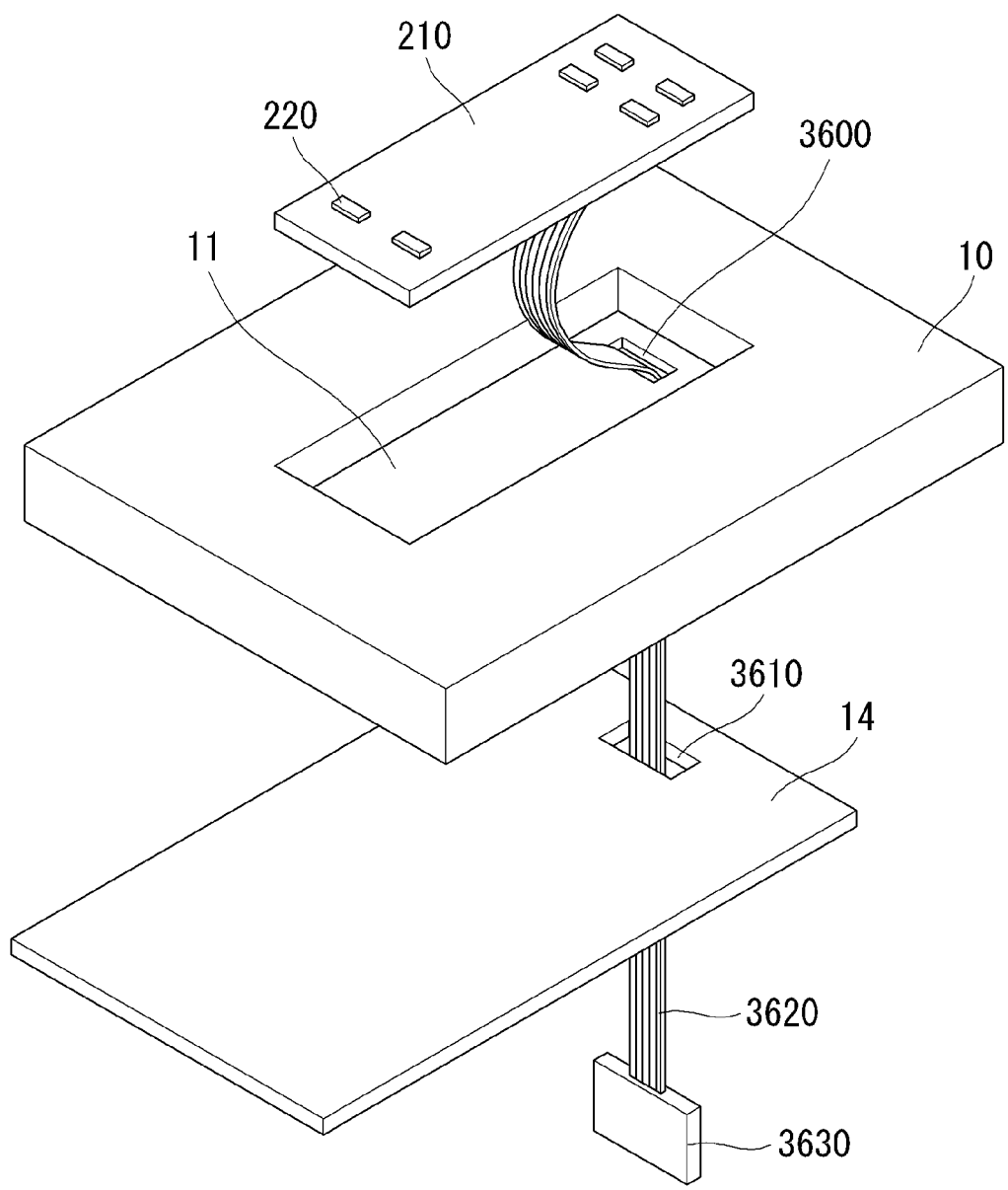

Moreover, as shown in FIG. 37, a hole 3600 may be formed in the base layer 10. The hole 3600 formed in the base layer 10 is referred to as the first hole 3600.

In addition, the connector 900 disposed on the substrate 210 may be disposed at a position corresponding to the first hole 3600. Also, a second hole 3610 may be formed in the frame 14.

Furthermore, the cable 3620 for electrically connecting the driving board 3630 disposed at the back of the frame 14 and the light source 220 disposed on the substrate 210 may pass through the first hole 3600 and the second hole 36710. Accordingly, the driving board 3630 and the light sources 220 can be electrically connected.

Figure 38:
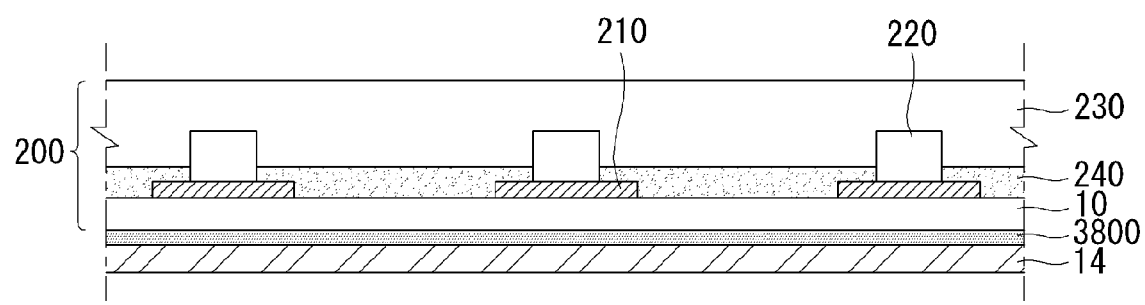

Moreover, as shown in FIG. 38, an adhesive layer 3800 may be disposed between the backlight unit 200 and the frame 14. Specifically, the adhesive layer 3800 may be formed between the base layer 10 of the backlight unit 200 and the frame 14. In this case, the thickness of the display device can be reduced by bringing the backlight unit 200 and the frame into further contact with each other.

What is claimed is:

1. A backlight unit comprising:
   a base layer;
   a plurality of substrates disposed on the base layer and separated from each other; and
   light sources disposed on each of the substrates,
   wherein:
   the plurality of substrates includes a first substrate and a second substrate, and
   the light sources include a first light source disposed on the first substrate and a second light source disposed on the second substrate,
   wherein:
   the base layer includes a first part overlapping with the first substrate, a second part overlapping with the second substrate, and a third part positioned between the first part and the second part,
   the third part has a maximum thickness at a first position, the maximum thickness being thicker than the first part and the second part, and
   a thickness of the base layer gradually increases from the first part to the first position, and the thickness of the base layer gradually decreases from the first position to the second part,
   wherein the light sources each include a respective light emitting face configured to emit light,
   wherein a light emitting face of the first light source is configured to face the first position, and a light emitting face of the second light source is configured to face opposite to the first position, and
   wherein a first slope of the base layer from the first part to the first position is less than a second slope of the base layer from the first position to the second part.

2. The backlight unit of claim 1, wherein a plurality of grooves are formed in the base layer, and the substrates are positioned in the grooves.

3. The backlight unit of claim 2, wherein the depth of the grooves is greater than the height from a bottom of the substrates to the top of the light sources.

4. The backlight unit of claim 2, wherein the depth of the grooves is less than a thickness of the substrates.

5. The backlight unit of claim 2, wherein a hole is formed in each groove.

6. The backlight unit of claim 1, further comprising a resin layer covering the substrates and the light sources.

7. The backlight unit of claim 6, wherein the resin layer comprises portions positioned on top of the base layer.

8. The backlight unit of claim 6, wherein the resin layer comprises a portion in which a height measured from a bottom of the base layer is less than a maximum thickness of the base layer.

9. The backlight unit of claim 8, wherein the resin layer comprises a recessed portion recessed toward the bottom of the base layer, and the recessed portion comprises a portion overlapping with the light sources.

10. The backlight unit of claim 1, further comprising a reflection layer disposed on top of the base layer.

11. The backlight unit of claim 10, wherein the reflection layer comprises portions overlapping with the substrates.

12. The backlight unit of claim 1, wherein the substrates comprise:
    a first substrate where a plurality of light sources are disposed; and
    a second substrate disposed in parallel to the first substrate and having a plurality of light sources disposed thereon.

13. The backlight unit of claim 12, wherein the gap between the first substrate and the second substrate is greater than a width of the first substrate or a width of the second substrate.

14. The backlight unit of claim 1, wherein a rate of change in the thickness of the base layer between the first substrate and the first position is greater than a rate of change in the thickness of the base layer between the second substrate and the first position, and the light sources disposed on the first substrate emit light in the direction becoming distant from the first position, and the light sources disposed on the second substrate emit light toward the first position.

15. The backlight unit of claim 1, wherein the light emitting direction of the light sources disposed on the first substrate is different from the light emitting direction of the light sources disposed on the second substrate.

16. The backlight unit of claim 1, wherein the light emitting direction of a plurality of light sources disposed on the first substrate or the second substrate is the same.

17. A display device comprising:
a display panel;
a backlight unit disposed at a back of the display panel; and
a back cover disposed at a back of the backlight unit,
the backlight unit comprising:
a base layer;
a plurality of substrates disposed on the base layer and separated from each other; and
light sources disposed on the plurality of substrates, wherein:
the plurality of substrates includes a first substrate and a second substrate, and
the light sources include a first light source disposed on the first substrate and a second light source disposed on the second substrate,
wherein:
the base layer includes a first part overlapping with the first substrate, a second part overlapping with the second substrate, and a third part positioned between the first part and the second part,
the third part has a maximum thickness at a first position, the maximum thickness being thicker than the first part and the second part, and
a thickness of the base layer gradually increases from the first part to the first position, and the thickness of the base layer gradually decreases from the first position to the second part,
wherein the light sources each include a respective light emitting face configured to emit light,
wherein a light emitting face of the first light source is configured to face the first position, and a light emitting face of the second light source is configured to face opposite to the first position, and
wherein a first slope of the base layer from the first part to the first position is less than a second slope of the base layer from the first position to the second part.

18. The display device of claim 17, further comprising a frame disposed at the back of the base layer.

* * * * *